United States Patent [19]
Loukes et al.

[11] 3,958,969
[45] May 25, 1976

[54] MANUFACTURE OF GLASS

[75] Inventors: David Gordon Loukes, Prescot; William Ramsey Maltman; Colin Robert Howard, both of St. Helens, all of England

[73] Assignee: Pilkington Brothers Limited, St. Helens, England

[22] Filed: Nov. 19, 1974

[21] Appl. No.: 525,279

[30] Foreign Application Priority Data
Nov. 23, 1973  United Kingdom............... 54497/73

[52] U.S. Cl............................. 65/30 E; 65/65 A; 65/99 A; 65/182 R
[51] Int. Cl.²........................................ C03B 18/02
[58] Field of Search.......... 65/23, 65 A, 99 A, 30 E, 65/182 R

[56] References Cited
UNITED STATES PATENTS

| | | | |
|---|---|---|---|
| 3,505,049 | 4/1970 | Plumat............................... | 65/30 E |
| 3,632,321 | 1/1972 | Plumat et al........................ | 65/30 E |
| 3,765,855 | 10/1973 | Larrick............................... | 65/30 E |
| 3,850,605 | 11/1974 | Maltman et al..................... | 65/99 A |

*Primary Examiner*—Arthur D. Kellogg
*Attorney, Agent, or Firm*—Burns, Doane, Swecker & Mathis

[57] ABSTRACT

Surface modified glass is produced by method and apparatus in which the glass is contacted with a molten body, for example of a molten metal or molten alloy while the glass temperature is such that it can be modified by migration of cations from the molten body into the glass surface. This cationic migration is electrically induced and the molten material is periodically connected as a cathode with respect to the glass for a preset time sufficient at least partially to deoxidise the molten material. Non-oxidising conditions may be maintained in the molten material and the electrical action at the interface between the molten body and the glass while the molten body is connected as a cathode causes reduction of at least a proportion of the cations in the glass surface to produce a metallic dispersion.

The invention is particularly applicable to the modification of the upper surface of a ribbon of float glass advancing along a molten metal bath.

25 Claims, 15 Drawing Figures

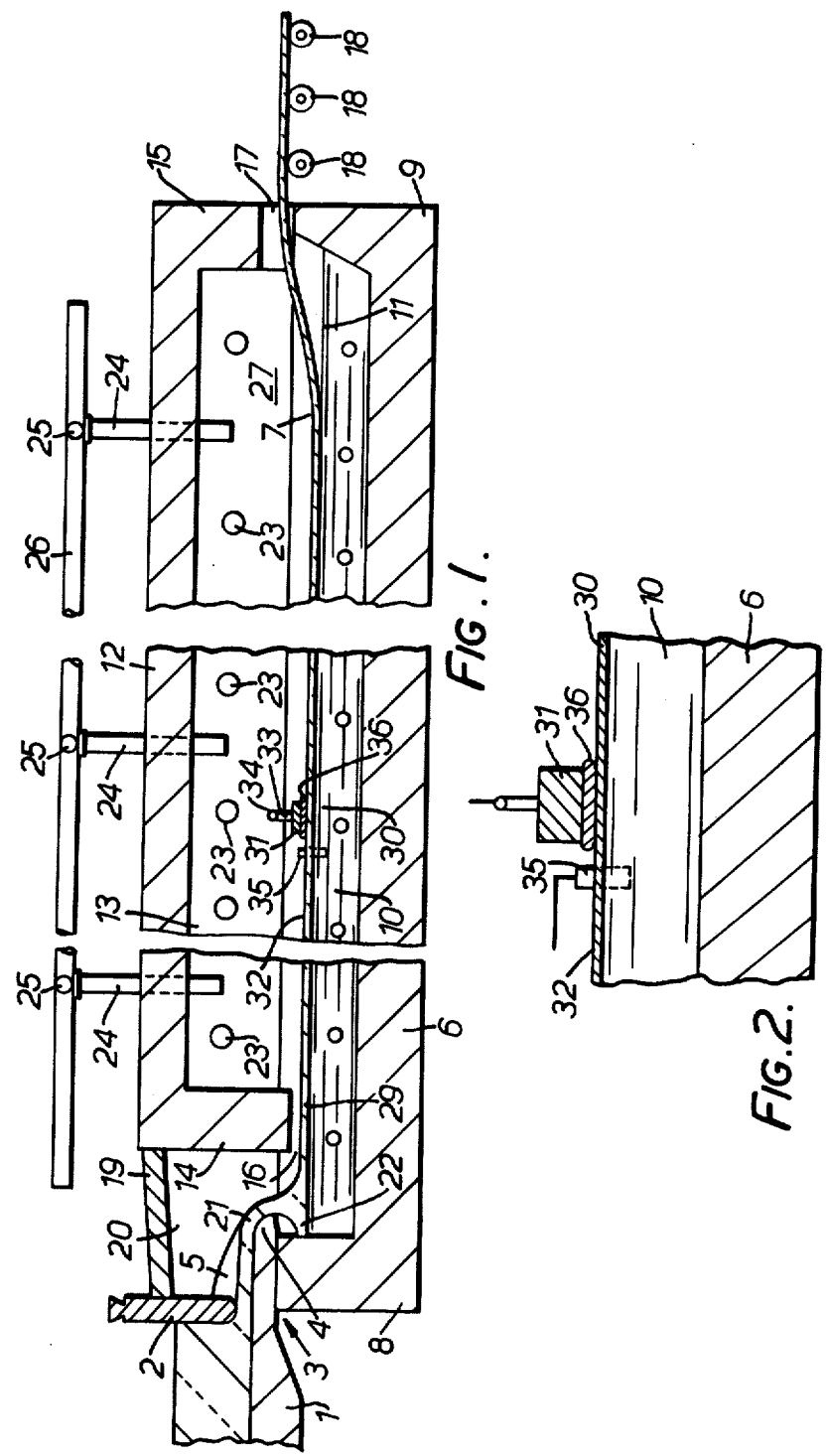

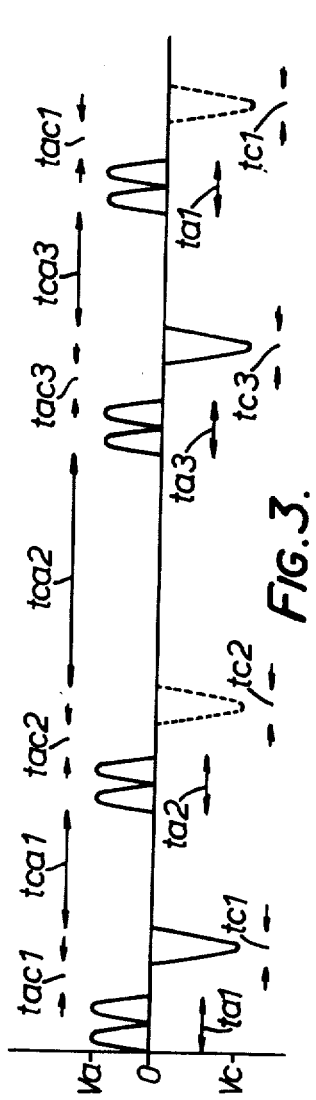
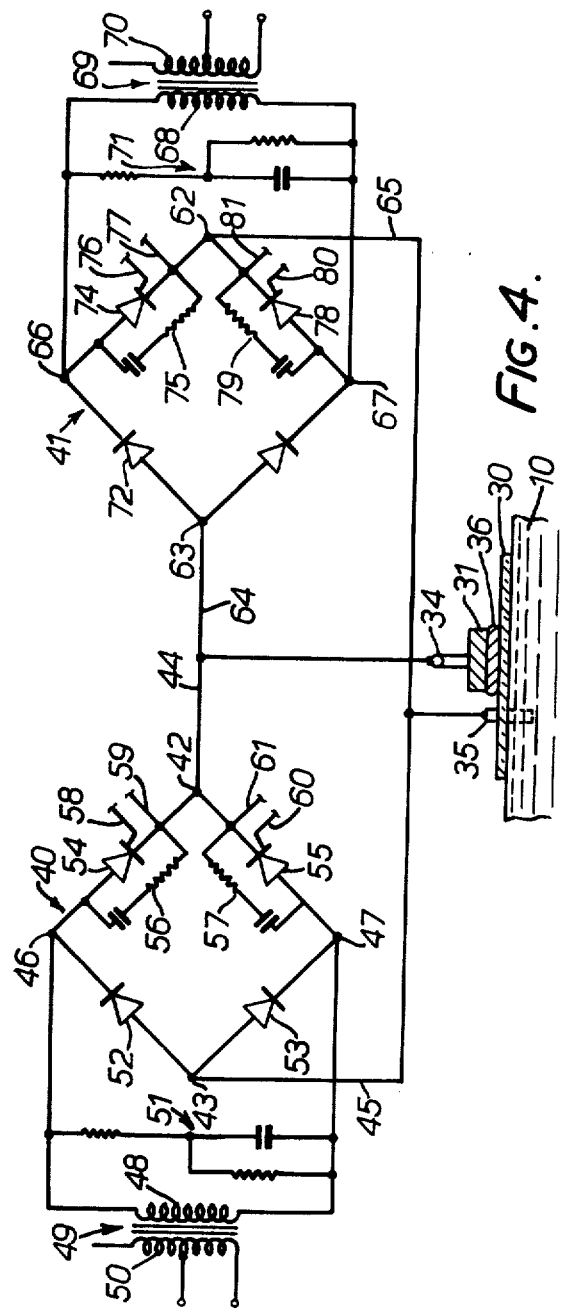
FIG.3.
FIG.4.

MANUFACTURE OF GLASS

BACKGROUND OF THE INVENTION

1. Field of the Invention

This invention relates to glass manufacturing methods for producing glass with a modified surface, and more particularly to methods of manufacturing glass having a metallic dispersion of predetermined intensity in a surface thereof. The metallic dispersion may be a uniform metallic dispersion developed in the surface of the glass, particularly flat glass which is modified by the introduction of a metallic dispersion into a surface layer of the glass to enhance solar radiation reflection and absorption by the glass thereby reducing the direct transmission of solar radiation through the glass and providing a high visible light reflection from the surface of the glass containing the metallic dispersion.

The invention may also be employed in glass manufacturing methods in which a metallic dispersion of predetermined intensity is introduced into the glass surface in the form of a decorative pattern which may have a different appearance when viewed by reflected and by transmitted light.

2. Description of the Prior Art

Flat glass with a concentration of metal embodied in a surface layer of the glass has been produced by a modification of the float process. In the float process, flat glass in ribbon form is advanced along the surface of an elongate molten metal bath. A body of molten metal, either a pure metal or a metal alloy, has been confined in contact with the upper surface of the ribbon of glass and the surface constitution of the glass has then been modified by passing an electric current through the glass between the molten metal body and the bath to cause migration of metal ions from the molten metal body into the upper surface of the ribbon of glass.

When employing this method with certain molten alloy bodies, for example copper/lead alloy, regulation of operating conditions has enabled the relative proportions of the two elements of the alloy which migrate into the glass surface to be controlled. Metal ions in the glass surface become reduced to metallic form by subsequent exposure of the ion-rich glass surface to the reducing atmosphere which is maintained over the bath in the customary way of operating the float process. A typical atmosphere contains 90% nitrogen and 10% hydrogen.

Other alloys have been employed, for example silver/bismuth alloys, nickel/bismuth alloys, copper/bismuth alloys and nickel/tin alloys. It has also been proposed to employ a pure metal, for example indium, for treating the glass. Usually the molten metal body is located in contact with the upper surface of the advancing ribbon of flat glass by clinging to a locating member which is positioned in the tank structure containing the molten metal bath so as to extend transversely across the path of travel of the ribbon of glass. The locating member may be of elongate rectangular form, and when direct current is passed from the locating member so as to cause ionic flux across the interface between the molten metal body and the glass, a uniform metallic dispersion in the glass surface results. The use of alternating current has been proposed in order to provide treatment of the upper surface from the molten metal body located in contact with that surface and to provide treatment of the lower surface of the advancing ribbon with metal from the molten metal bath.

It has also been proposed to produce shaded characteristics longitudinally of the ribbon of glass, that is in the direction of advance of the ribbon, by continuously varying the voltage applied to the molten metal body and so continuously varying the intensity of surface modification of the glass. Two molten alloy pools have been proposed for carrying out a two-stage treatment of the glass. A reducing agent, for example arsenic may be introduced into the upper surface of the ribbon from the first pool, and metal ions which are to produce a metallic dispersion in the glass, for example copper ions, are caused to migrate into the glass from the second pool and are reduced by the arsenic already present in the glass to give the glass a distinctive colour, commonly, in the case of copper, red. This manner of operating does not rely on reducing properties of the protective atmosphere over the bath to develop colour in the glass surface.

It has further been proposed that a first molten metal body be connected as an anode while a second molten metal body is connected as a cathode so that an element, for example lithium or zinc, migrates into the upper surface of the glass from the first body and the same element migrates into the lower surface of the glass from the molten metal bath supporting the ribbon of glass, in which bath a predetermined concentration of that element is maintained. This produces symmetrical treatments of the glass surfaces, for example lithium-rich glass surfaces which are subsequently employed in a chemical toughening process, or zinc-rich glass surfaces which improve the weathering properties of the glass.

Generally, when uniform modification of the surface of the glass is to be effected, the shape of the area of contact between the molten metal body from which ionic migration takes place and the upper surface of the glass is maintained of rectangular configuration as described above. Because the molten metal or metal alloy clings to the metal bar, the configuration of the area of contact between the molten metal or metal alloy and the glass corresponds to the configuration of the face of a locating member adjacent the glass. Thus patterned float glass may be produced by a method in which the molten metal body is shaped to a configuration progenitive of a pattern to be introduced into the glass and a predetermined ionic migration between the shaped molten body and the glass is engendered in a defined time period which is related to the speed of advance of the ribbon of glass beneath the shaped molten body. The time period is sufficient to produce a pattern element of modified glass in the glass surface which pattern element exhibits its derivation from the configuration of the molten body, and hence from the configuration of the locating member. A repeated pattern is introduced by repeatedly engendering ionic migration in a sequence of defined time periods determined by applying to the molten body an anodic waveform of voltage pulses at spaced intervals defining that sequence of time periods of ionic migration from the molten body into the glass.

In the treatment processes described above, a molten metal or metal alloy body is connected as an anode with respect to the glass to cause migration of metal cations from the molten body into the glass. In practice, the application of the anodic electricity to the molten body may result in partial oxidation of the molten body.

Such oxidation may reduce the efficiency of the anodic treatment; loss of efficiency may be particularly acute when a molten indium body is used, but is also significant with other molten metals and alloys, for example molten copper/lead alloys.

SUMMARY

The present invention is based on the surprising discovery that a single body of molten material contacting the upper surface of the ribbon of glass can be employed as a source of metal ions to migrate into the glass and to produce reducing conditions at the interface between the molten body and the glass, so that any disadvantages arising from anodic oxidation of the pool may be overcome or at least alleviated and if desired, at least a proportion of the metal ions which have migrated from the molten material into the glass may be reduced to develop in the glass surface a metallic dispersion of material from the molten body.

It is an object of the present invention to employ this discovery both in methods for the production of a uniform metallic dispersion in a glass surface and in methods in which a shaped locating member is employed to locate a molten metal body in contact with the upper surface of the glass and a pulsed waveform is applied to that body to introduce a pattern into the glass.

According to the present invention there is provided in a method of modifying a glass surface in which glass is contacted with a molten material while the glass is at a temperature at which it is susceptible to surface modification and migration of cations from the molten material into the glass is electrically induced, the improvement comprising connecting the molten material as a cathode with respect to the glass for a preset time sufficient at least partially to deoxidise the molten material.

A minor proportion of metal oxide may be tolerable in the molten material and sufficient migration of cations from the glass into the molten material is caused to maintain non-oxidising conditions in the molten material in the sense that oxide concentration in the molten material is at a level at which it does not affect the process to an unacceptable extent.

Consequently the invention also provides in a method of modifying a glass surface comprising connecting the molten material as a cathode for a preset time to cause migration of cations from the glass into the molten material for a preset time to maintain non-oxidising conditions in the molten material.

The treatment for modifying the glass surface may take place in a sequence of repetitive steps and from this aspect the invention comprehends periodically during said migration of cations into the glass, connecting the molten material as a cathode for a preset time to cause in each said preset time migration of cations into the molten material to maintain non-oxidising conditions in the molten material.

For producing glass having a metallic appearance the invention also includes a method of manufacturing glass having a metallic dispersion of predetermined intensity in a surface thereof, comprising contacting the glass with a molten body while the glass is at a temperature at which it is susceptible to surface modification, electrically connecting the molten body as an anode with respect to the glass to cause migration of cations into the glass and to develop a cation concentration in the glass surface, and subsequently, before any substantial dispersion of said cation concentration into the glass, connecting the molten body as a cathode with respect to the glass to promote electrical action at the interface between the molten body and the glass causing reduction of at least a proportion of the cations in the glass surface to produce said metallic dispersion.

The molten body may be a body of molten metal, either a single metal or an alloy of two or more metals, and the invention further comprehends a method of manufacturing glass having a metallic dispersion of predetermined intensity in a surface thereof, comprising contacting a surface of the glass with a body of molten metal while the glass is at a temperature at which it is susceptible to surface modification, electrically connecting the molten body as an anode to cause migration of metal ions from the molten metal body into the glass surface, and subsequently electrically connecting said molten metal body as a cathode with respect to the glass surface to cause cathodic reduction of metal ions in the glass surface and thereby produce said metallic dispersion.

Cations which migrate from the glass into the molten material when the molten body is connected as a cathode are predominantly those of highest ionic mobility in the glass and across the interface between the glass and the molten body. When the glass has an alkali-metal constituent such as sodium or lithium oxide those ions readily migrate from the glass surface during a period of cathodic treatment, and the invention further comprehends a method of producing a metallic dispersion of predetermined intensity in a surface of glass having an alkali-metal constituent, comprising contacting the glass with a molten metal body while the glass is at a temperature at which it is susceptible to surface modification, electrically connecting the molten metal body as an anode with respect to the glass to cause migration of metal ions into the glass, and subsequently connecting the molten body as a cathode with respect to the glass to cause migration of alkalimetal ions from the glass into the molten body and thereby promote reducing conditions in the molten body.

An aspect of the result produced by the invention is that material of the molten body which is to constitute the required dispersion in the glass surface is reconstituted in the glass surface in the form in which it existed in the molten body, before contact between the modified glass surface and the molten body is broken. From this aspect the invention provides in a method of modifying a glass surface in which glass is contacted with a molten material while the glass is at a temperature at which it is susceptible to surface modification, and cationic migration of a constituent of the molten material is electrically induced into the glass surface, subsequently electrically causing donation of sufficient negative charge from the molten material into the cation-rich glass surface to cause said constituent to revert in the glass to its initial chemical form thereby producing a required dispersion of that constituent in the glass surface while the molten material is in contact with the glass.

Preferably ionic migration is controlled by controlling an electric flux from the molten metal body into the glass and from this aspect a preferred method according to the invention of manufacturing glass having a metallic dispersion of predetermined intensity in a surface thereof comprises contacting the glass while at a temperature at which the glass is susceptible to surface modification with a confined molten metal body, electrolytically causing migration of metal ions from that body into the glass surface for a preset time, subsequently electrolytically causing ionic flow from that surface into the body to engender reducing conditions at the interface between the molten metal body and the glass, and then maintaining contact between the molten body and the glass for a preset time permitting reduction of metal ions in the glass surface.

Usually electric flux is engendered by connecting an electric power supply circuit to the molten metal body and to an electrically conductive support for the glass being modified. Such support, in the case of treatment of a glass article such as a moulded glass article may be a solid electrically conductive support such as a graphite electrode shaped to fit into the interior of the glass article and to make sufficient electrical contact with the inner surface of the glass. In the case of treatment of a ribbon of glass supported on rollers a molten metal body may be located beneath the surface of the ribbon by clinging to a locating member so as to make electrical contact with the undersurface of the glass and permit electric flux through the glass either to or from the molten metal body located in contact with the other surface of the glass.

Usually in the operation of the float process the electric supply is connected between the molten metal body located in contact with the upper surface of the ribbon of glass and the molten metal bath along which the ribbon of glass is being advanced. Electric flux from a molten body into the glass may also be engendered by employing two locating electrodes which locate molten electrically conductive bodies in contact with the same surface of the glass which locating electrodes are sufficiently close together that the molten bodies do not touch but that current flow can take place from one body to the other through the glass only and by this arrangement ionic migration can be engendered from one of the bodies followed by cathodic reduction at the interface between that one body and the glass without the other surface of the glass being affected.

Preferably the invention includes causing said electrically induced migration of cations from the molten material into the glass surface by electrically connecting said molten material as an anode with respect to the glass for a first preset time, and after a predetermined interval electrically connecting the molten material as a cathode with respect to the glass for a second preset time sufficient at least partially to deoxidise the molten material.

From another aspect the invention includes electrically connecting the molten metallic body as an anode with respect to the glass for a first preset time, and after a predetermined time interval and before any substantial dispersion of said cation concentration into the glass, electrically connecting the molten metallic body as a cathode with respect to the glass for a second preset time sufficient to cause reduction of at least a proportion of the cations in the glass surface to produce said metallic dispersion.

The invention further comprehends a method of manufacturing flat glass having a metallic dispersion of predetermined intensity in a surface thereof comprising advancing the glass at a controlled speed beneath a confined molten metal body contacting the upper surface of the glass, and applying to the molten metal body a voltage waveform comprising anodic and cathodic pulses of preset duration separated by preset intervals such that ionic migration into the glass surface from the molten body when it is anodic with respect to the glass precedes cathodic reduction of those ions in the contacted glass surface during and subsequent to the period when the molten body is cathodic with respect to the glass, and regulating the amplitude, duration and temporal spacing of the pulses of the waveform to produce said metallic dispersion in the glass.

In particular, when operating the invention for manufacturing float glass having a metallic dispersion of predetermined intensity in a surface thereof, the method according to the invention may comprise advancing a ribbon of glass at a controlled speed along a bath of molten metal, locating a molten metal body on the upper surface of the advancing ribbon of glass, applying to the molten metal body a voltage waveform comprising anodic and cathodic pulses of preset duration separated by preset intervals so related to the ribbon speed that at least one anodic and one cathodic pulse occur in the time taken for an increment of the ribbon to pass beneath the molten metal body, whereby migration of metal cations into the glass surface from the molten body when it is anodic with respect to the glass precedes cathodic reduction of those cations in the glass by the molten body during and subsequent to the time when the molten body is cathodic with respect to the glass, and regulating the amplitude, duration and temporal spacing of the pulses of the waveform to produce the required metallic dispersion in the glass.

When producing a continuous metallic dispersion in a surface of the ribbon of float glass the molten metal body may be of rectangular form extending transversely of the glass, and the amplitude, duration and spacing of the pulses of said voltage waveform may be preset to impart a striped appearance to the metallic dispersion.

When producing patterned float glass the molten metal body is shaped to a configuration progenitive of an element of a pattern to be produced in the glass by a corresponding pattern-forming distribution of said metallic dispersion, and the amplitude, duration and spacing of the pulses of said voltage waveform are preset to produce said pattern-forming distribution in the glass surface.

The quantity of cathodic electricity which passes may be different from the quantity of anodic electricity which passes. The quantity of cathodic electricity may for example be from 5% to 50% when the cathodic current is used principally to maintain non-oxidising conditions, or may be from 30% to 99% when producing reducing conditions at the glass surface.

The molten material may be molten indium.

The invention also provides apparatus for manufacturing glass with a modified surface comprising an electrically conductive contact for one surface of the glass, electrode means for maintaining a body of molten material in contact with the other surface of the glass, an electrical supply source connected to said contact and to said electrode means through a switchable supply circuit, and a control waveform generator connected to said switchable supply circuit and including settable means operable to cause the generator to produce a control waveform consisting of a sequence of switching pulses for application to the switching circuit to control the switching of a sequence of anodic and cathodic current pulses to the molten body to effect the required modification of the glass surface.

In a preferred embodiment the switchable supply circuit comprises two thyristor bridge circuits respectively controlling the supply of anodic and cathodic current pulses to the molten body, and the waveform generator is connected to trigger electrodes of the thyristors and is operable to produce timed firing pulses for application to the thyristors to effect switching to the molten body of the required sequence of anodic and cathodic current pulses.

BRIEF DESCRIPTION OF THE DRAWINGS

FIG. 1 is a sectional elevation of float glass manufacturing apparatus adapted for operating the method of the invention including a tank structure containing a bath of molten metal with a roof structure over the tank structure, means for delivering molten glass to the bath and a locating member mounted above the bath surface to which a molten metal body clings and is thereby located on the upper surface of the advancing ribbon of float glass, FIG. 2 is an enlarged sectional view of the locating member of FIG. 1, FIG. 3 is a diagrammatic representation of a voltage waveform comprising anodic and cathodic pulses which is applied to the molten metal body, FIG. 4 is a circuit diagram of thyristor bridges which generate waveforms of the kind shown in FIG. 3.

DESCRIPTION OF THE PREFERRED EMBODIMENTS

Figure 5:
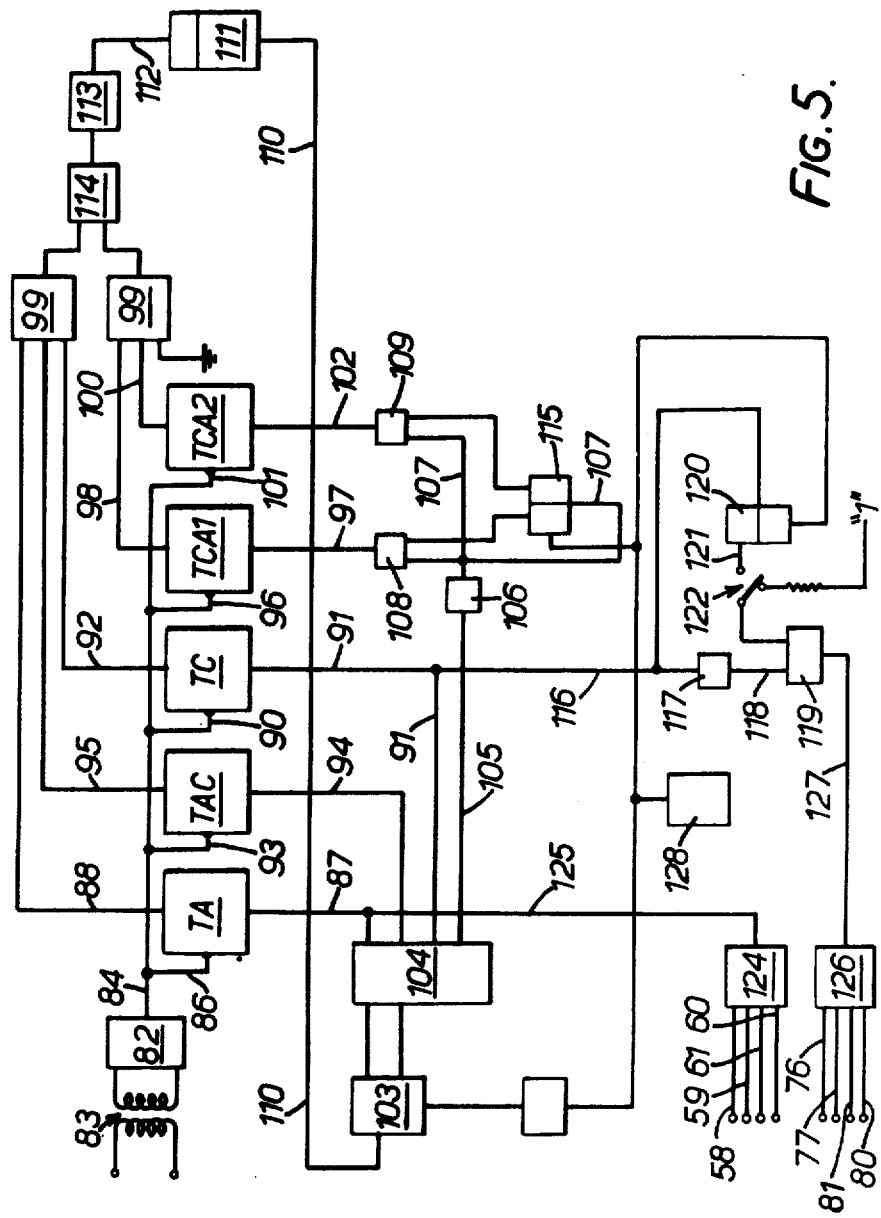
FIG. 5 is a schematic diagram of a control circuit for producing thyristor firing pulses for firing the thyristors of FIG. 4.

In the drawings like references indicate the same or similar parts.

Referring to FIG. 1 of the drawings, a forehearth of a continuous glass melting furnace is indicated at 1 and a regulating tweel at 2. The forehearth ends in a spout 3 comprising a lip 4 and side jambs 5, one of which is shown. The lip 4 and side jambs 5 together constitute a spout of generally rectangular cross-section. The spout 3 is disposed above the floor 6 of an elongated tank structure including side walls 7 joined together to form an integral structure with the floor 6, an end wall 8 at the inlet end of the tank, and an end wall 9 at the outlet end of the tank. The tank structure holds a bath of molten metal 10 whose surface level is indicated at 11. The bath is for example, a bath of molten tin or of a molten tin alloy in which tin predominates and which has a specific gravity greater than that of the glass.

A roof structure is supported over the tank structure and includes a roof 12, side walls 13 and integral end walls 14 and 15 respectively at the inlet and outlet ends of the bath. The inlet end wall 14 extends downwardly close to the surface 11 of the molten metal bath 10 to define with that surface an inlet 16 which is restricted in height and through which molten glass is advanced along the bath. The outlet end wall 15 of the roof structure defines with the outlet end wall 9 of the tank structure, an outlet 17 through which the ultimate ribbon of glass produced on the bath is discharged onto driven conveyor rollers 18 mounted outside the outlet end of the tank structure and disposed somewhat above the level of the top of the end wall 9 of the tank structure. The ultimate ribbon of glass produced is lifted clear of the top of the wall 9 for discharge from the bath through the outlet 17.

The rollers 18 convey the ultimate ribbon of glass having a modified upper surface, to an annealing lehr in well known manner, and also apply tractive force to the ribbon of glass to advance the ribbon along the bath at a regulated speed.

An extension 19 of the roof structure extends up to the tweel 2 to form a chamber with side walls 20 in which the spout 3 is enclosed.

The glass employed in carrying out the invention generally has an alkali-metal oxide content of from 10% to 20% by weight. Usually this glass is a soda-lime-silica glass.

Molten soda-lime-silica glass 21, for example having an alkali-metal oxide content of from 12% to 16% by weight, is poured onto the bath 10 of molten metal from the spout 3 and the tweel 2 regulates a rate of flow of molten glass 21 over the spout lip as the molten glass pours onto the glass surface to form a layer of molten glass on the bath. The temperature of the glass as it is delivered to and advanced along the bath at the inlet end is usually about 1,050°C and a temperature gradient exists along the bath down to a temperature of the order of 650°C at the outlet end of the bath where the ultimate ribbon is discharged. This temperature gradient is regulated by heating elements indicated at 23 which are mounted in the roof structure and radiate downwardly towards the molten metal bath and towards the ribbon of glass advancing along the bath.

A protective atmosphere is maintained at a plenum in the headspace over the bath being supplied through ducts 24 which are connected by branches 25 to a header 26 which is connected to a supply of protective gas, preferably containing a reducing constituent. Usually the protective atmosphere consists of 10% hydrogen and 90% nitrogen but the relative proportions of these constituents may be varied when it is required to vary the reducing conditions to which the modified upper surface of the ribbon of glass is exposed during the terminal part of its travel along the bath prior to discharge through the outlet 17. There is outward flow of protective atmosphere through the inlet 16 to fill the chamber enclosing the spout, and through the outlet 17 from the headspace.

The temperature of the molten glass delivered to the bath is regulated by the heating elements 23 at the inlet end so as to ensure that the layer of molten glass 29 is established on the bath and is advanced through the inlet 16, during which advance there is lateral flow of the molten glass on the bath to develop on the bath surface, a buoyant body of molten glass which is then advanced in ribbon form as a ribbon of glass 30 having flat parallel surfaces. The width of the tank structure at the surface level of the bath is greater than the width of the buoyant body of molten glass so that the initial free lateral flow of the molten glass is uninhibited.

An electrode 31 in the form of a metal bar of rectangular shape is mounted transversely of the tank structure just above the path of travel of the upper surface of the ribbon of glass 30. A gap, for example about 4 millimetres, exists between the underface of the bar 31 and the upper surface 32 of the ribbon of glass. The bar 31 is maintained in position by struts 33 which suspend the bar from an overhead electrically conductive beam indicated at 34, which is fixed across the tank structure. Electrical connection is made to the bar 31 through the beam 34 and the struts 33. Electrical connection is also made to the molten metal bath 10 by an electrode 35 which dips into the bath alongside the path of travel of the ribbon of glass. The electrode bar 31 is located in the tank structure where the temperature of the ribbon of glass is in the range 700°C to 800°C and acts as a locating member for a molten metallic body 36, of a molten metal or molten alloy which clings to the underface of rectangular configuration of the bar 31 and is suspended from that underface against the upper surface 32 of the ribbon of glass.

In carrying out the invention for the manufacture of a ribbon of float glass having a metallic dispersion of predetermined intensity in the upper surface of the ribbon being a dispersion of metal derived from the molten metal body 36, there is applied to the molten metal body a voltage waveform comprising alternate anodic and cathodic pulses of preset duration separated by preset intervals so related to the ribbon speed as determined by the speed of the traction rollers 18 that at least one anodic and one cathodic pulse occur in the time taken for an increment of the ribbon of glass 30 to pass beneath the molten metal body 36. One generalised form of voltage waveform is illustrated in FIG. 3. This voltage waveform is derived from a 50 Hz supply and is built up from half-wave units of that supply which means a basic 10 ms unit of timing. The examples of operation to be described were produced with equipment having a basic 50 Hz supply which gives greater flexibility.

In FIG. 3, Va indicates the amplitude of an anodic pulse and Vc indicates the amplitude of a cathodic pulse applied to the molten body 36. These amplitudes are adjustable and are usually different from each other.

The waveform of FIG. 3 comprises a first anodic pulse of duration ta1 of 20 ms made up of two positive going halfwaves of the 50 Hz supply. A pre-set interval tac1 of 10 ms elapses from the end of the first anodic pulse to the first cathodic pulse whose duration tc1 is 10 ms. Then follows an interval tca1 of 40 ms before the next anodic pulse ta2 also of 20 ms duration. The second cathodic pulse of duration tc2 may follow after an interval of 10 ms and is indicated by dotted lines. Alternatively the second cathodic pulse may follow after a longer interval of 130 ms which includes the interval tca2 of 80 ms duration between the end of the possible second cathodic pulse and the third anodic pulse ta3 also of 20 ms duration. The cycle is then repeated with the cathodic pulse tc3 of 10 ms duration after an interval of 10 ms followed by an interval tca3 of 40 ms duration before the fourth anodic pulse ta4. Thus while the upper surface of the ribbon of glass being treated is passing beneath the molten body 36 the metal surface in contact with the glass is alternatively anodic and cathodic according to the waveform of FIG. 3.

The current pulses which constitute the waveform of FIG. 3 are derived from two thyristor bridge rectifiers illustrated in FIG. 4 and respectively identified by the reference numerals 40 and 41. The bridge 40 is the source of positive going anodic pulses developed between output terminals 42 and 43 of the bridge. The terminal 42 is connected by a line 44 to the electrically conductive beam 34 which supports the electrode bar 3 above the ribbon of glass. The output terminal 43 is connected by a line 45 to the electrode 35 which contacts the molten metal of the bath.

The bridge 40 has input terminals 46 and 47 connected across a secondary winding 48 of a supply transformer 49 having a variable tapping primary winding 50 for connection to a 50 Hz supply. Alteration of the position of connection to the primary winding varies the amplitude Va of an anodic pulse. A transient suppression circuit 51 shunts the secondary winding 48 of the supply transformer. The bridge 40 comprises two heavy duty rectifier diodes 52 and 53. The diode 52 is connected between the terminals 43 and 46 and the diode 53 between the terminals 43 and 47.

The bridge also comprises two heavy duty thyristors 54 and 55 with associated shunt suppression circuits 56 and 57. The thyristor 54 is connected between the terminals 46 and 42 and the thyristor 55 between the terminals 47 and 42. Firing of the thyristor 54 is controlled by firing pulses fed to terminals 58 and 59 and firing of thyristor 55 is controlled by firing pulses fed to terminals 60 and 61.

the construction of bridge 41 which produces the cathodic current pulses is similar. This bridge has output terminals 62 and 63 respectively connected by lines 64 and 65 to the connection beam 34 connected to the electrode bar 31 and to the electrode 35 which dips into the molten metal bath. Input terminals 66 and 67 of the bridge 41 are connected to a secondary winding 68 of a supply transformer 69 whose primary winding 70 is connected by a variable tapping to the 50 Hz supply. Adjustment of the tapping on the primary winding varies the amplitude Vc of cathodic pulses. A transient suppression circuit 71 shunts the secondary winding 68. Two heavy duty rectifier diodes 72 and 73 constitute two of the bridge arms and respectively connect the output terminal 63 to the input terminals 66 and 67. One thyristor 74 of the bridge with its associated shunt suppression circuit 75 is connected between the input terminal 66 and the output terminal 62 and has firing terminals 76 and 77 for receiving firing pulses. The second thyristor 78 with its shunt circuit 79 is connected between the input terminal 67 and the output terminal 62 and receives firing pulses on terminals 80 and 81.

FIG. 5 illustrates schematically the timing circuit for generation of a control waveform in terms of firing pulses which are transmitted to the thyristor bridges 40 and 41 on lines 58 to 61, 76, 77, 80 aand 81. A clock pulse generator 82 having an input derived through a transformer 83 from the same 50 Hz supply as is connected to the primary windings 50 and 70 of the transformer supplying bridges 40 and 41, is of conventional construction. The output from the clock pulse generator on line 84 is a clock pulse train at a frequency of 100 Hz synchronised to the 50 Hz supply.

The time periods ta1, tac1, tc1, tca1 and tca2 which form the basic time intervals controlling the constitution of the waveform of FIG. 3 are respectively controlled by timers TA, TAC, TC, TCA1 and TCA2. Each of the timers is of conventional construction and the timers together form the central feature of a control waveform generator. Timers TA and TC are each a decade counter the four binary outputs of which are connected to gates having inputs connected to settable contacts on a thumb wheel switch so that when coincidence occurs between energised output lines of the counter and the setting of the thumb wheel switch an output pulse is generated. The counter TA counts the 100 Hz pulses on the clock pulse line 84 which is connected by an input line 86 to the counter. The counter TA is re-set by holding an input on line 87 at a "0" level and when the timer has counted a predetermined number of clock pulses as determined by the setting on the thumb wheel switch an output line 88 from the counter switches from a "o" state to a "1" state.

The output line 88 is connected to a NOR gate 89.

The counter TC which is of identical construction receives 100 Hz clock pulses on line 90 connected to the clock pulse line 84, and receives a re-set "0" level on a re-set line 91. Output line 92 from the counter switches from "0" to "1" when the number of clock pulses counter coincides with the number set in to the counter TC by the thumb wheel switch. The output line 92 is also connected to the NOR gate 89.

The counters TAC, TCA1 and TCA2 are all of the same conventional kind comprising three decade stages connected in cascade to constitute "10's", "100's" and "1,000's" stages. Appropriate thumb wheel switches are embodied in these counters which have the facility for pre-setting of shorter or longer intervals between each cathodic pulse and the next anodic pulse. The counter TAC has a clock pulse input on line 93 which is connected to the clock pulse line 84, a reset input on line 94 and an output on line 95 which is connected to the NOR gate 89.

The counter TCA1 has a clock pulse input on line 96 which is connected to the clock pulse line 84, a reset input on line 97 and an output on line 98 which is connected to a second NOR gate 99.

One input to the NOR gate 99 is earthed and the third input is connected by a line 100 to the output from the counter TCA2 which has a clock pulse input on line 101 connected to the clock pulse line 84 and a reset input on line 102.

The reset input for each of the timers is provided by the output of a reset pulse generator comprising a four-stage binary counter 103 the "1" and "2" outputs of which are connected to a two line-to-four line decoder 104 the four output lines of which are the reset lines 87, 94 and 91 for counters TA, TAC and TC and a fourth line 105 connected to a gate 106 whose output on line 107 is connected to two parallel gates 108 and 109 which generate the reset levels for transmission on reset lines 97 and 102 to the counters TCA1 and TCA2. The function of these gates will be described below.

The pulse input to the counter 103 is on line 110 which is connected to the output from a monostable delay circuit 111 whose input on line 112 is derived from a NAND gate 113. The input to the NAND gate 113 is from a NAND gate 114 having inputs connected to the outputs from the NOR gates 89 and 99.

Reset output from the gate 106 is also fed to an input of a bistable circuit 115 having two outputs respectively connected to inputs of the gates 108 and 109. This bistable circuit 115 in combination with the gates 106, 108 and 109 serves to switch control of the generation of firing pulses between the counters TCA1 and TCA2 and thereby switching different time intervals between a cathodic pulse and the next pulse as indicated by the different intervals tca1 and tca2 in FIG. 3.

The reset level on line 91 connected to timer TC is transmitted on line 116 to a NAND gate 117 whose output is connected by line 118 to an input of a further NAND gate 119 and to an input of a bistable circuit 120 having an output on line 121 connected by a switch 122 to the other input of the NAND gate 119. The switch 122 is a two-way switch and for normal operation the movable contact of the switch 122 is, as shown, connected to a resistor 123 which is connected to a positive potential, for example + 5 volts representing "1". With the switch in this position the line 121 is disconnected from the NAND gate 119 and normal operation ensues with a cathodic pulse between each successive pair of anodic pulses. That is the second cathodic pulse shown in dotted lines in FIG. 3 would be present. With the switch 122 in its second position connecting the line 121 to the NAND gate 119, the circuit is controlled to omit alternate cathodic pulses from the waveform.

The firing of the thyristors 54 and 55 of the bridge 40 to generate each anodic pulse ta is controlled by a thyristor firing circuit 124 of conventional construction and whose operation is synchronised to that of the 50 Hz supply. The firing circuit 124 is controlled by the level on an input line 125 which is connected to the reset line 87 of counter TA.

Firing of the thyristors 74 and 78 of bridge 41 is similarly regulated by firing pulses generated by a second thyristor firing circuit 126 also of conventional kind and synchronised to the supply, operation of which is controlled by the level on a line 127 connected to the output of the NAND gate 119.

A reset pulse generator 128 is connected by a reset line 129 through a NAND gate to the reset input of counter 103 and to a reset input of the bistable circuits 115 and 120. When the power is switched on a single reset pulse generated by the generator 128 resets the counter 103 and the two bistable circuits.

The condition for starting each of the timers of FIG. 5 is that the level on its reset input line shall switch to "0". The sequence of operation generatng the wave form of FIG. 3 begins when the output line 87 from decoder 104 has just gone to "O" and the lines 94, 91, and 105 are all at "1". Timer TA is counting and all the other timers are inhibited. All the timer outputs on lines 88, 95, 92, 98 and 100 are at "0" and the output of NOR gates 89 and 99 are at "1" and the output of NAND gate 113 is at "1".

When timer TA has counted the predetermined number of pulses set in by its thumb wheel switch its output line 88 goes to "1" and the output of NOR gate 89 goes to "0". The output of NAND gate 113 goes to "0" which level change from "1" to "0" is delayed by the monostable delay circuit 111 and is applied on line 110 to the input of counter 103. This results in a change in the decoded output of the counter so that line 87 goes to "1" and inhibits counter TA.

At the same time as the timer TA is inhibited so that its output line 88 switches to "0" level, reset line 94 switches to "O" level and enables timer TAC which proceeds to count the clock pulses fed to the timer on line 93. When line 87 connected to timer TA had been switched from inhibiting level "1" to count level "0" enabling the timer TA to count, the change in level pulse transmitted on line 125 to the thyristor firing circuit 124 generates therein a burst of firing pulses to fire the thyristors 54 and 55 sequentially on each half cycle of the supply to provide the current pulses indicated in FIG. 3 which constitute the anodic pulse fed to the molten metal body 36 contacting the glass. When timer TA is again inhibited at the end of the period ta the line 125 rises to level "1" and the transmission of firing pulses to the thyristor 54 and 55 is discontinued.

At that time the decoded output from the binary counter 103 switches line 94 to level "0" enabling counter TAC which proceeds to count the clock pulses on line 93 until the count registered in the timer coincides with the figure set in by the thumb wheel switches corresponding to the interval tac between the anodic pulse and the next cathodic pulse. At the end of the interval tac the output on line 95 rises to "1" and a pulse, delayed by the circuit 111 is fed on line 110 to the input of the binary counter 103 causing the decoded output on line 94 to rise to "1" and the output on line 91 to fall to "0" thereby inhibiting timer TAC and enabling timer TC. The thumb wheel switch of timer TC is set to determine the preset duration tc of the cathodic pulse. The reset level "0" which enables timer TC is fed on line 116 through NAND gate 117 and NAND gate 119 to the thyristor firing circuit 126 which controls operation of bridge 41 and the feeding through that bridge of the cathodic pulse to the molten metal body commences. At the end of the period tc when an output "1" appears on line 92 the counter 103 is steppeed on, timer TC is inhibited and by a change in level from "1" to "0" on line 105 either the timer TCA1 or TCA2 is enabled depending on the state of the gates 108 and 109. To produce an interval tca1 between the first cathodic pulse and the second anodic pulse, the bistable circuit 115 condictions gate 108 to permit the reset pulse from line 105 to enable timer TCA1 which then times out the interval tca1 set into the timer by its thumb wheel switch. At the end of time tca1 the level "1" appears on line 98 to generate a pulse on line 110 which steps on the counter 103 and the decoder 104 returns to its initial state with the line 87 at "0" enabling timer TA and commencing generation of the next anodic pulse.

At the time counter TCA1 had finished counting and was reset, a change in level from "1" to "0" was fed from gate 106 on line 130 to a trigger input of the bistable circuit 115 which circuit changes state just after the reset level has been switched through the gate 108 onto line 97 to decondition gate 108 and condition gate 109 to pass to the reset line 102 of timer TCA2 the next reset pulse appearing on line 107. In this way the interval between the second cathodic pulse and the third anodic pulse, that is the time tca2, can be controlled independently by the setting of the thumb wheel switch in timer TCA2.

The integers of the control circuit illustrated in FIG. 5, are conventional equipment. The operation has been described in simple terms by reference to the waveform of FIG. 3 which shows only two half-waves in each anodic pulse and only one half-wave for each cathodic pulse. It will be clear that with a higher frequency supply, for example 500 Hz the basic timing unit is 1 ms and each of the anodic and cathodic pulses will constitute a train of half-wave pulses.

When alternate cathodic pulses are to be omitted as indicated by the dotted lines in FIG. 3, the switch 122 is changed over to connect the line 121 to the NAND gate 119. The timer TC goes through its operation in each of the timing cycles but in alternate periods of operation of the timer TC and NAND gate 119 inhibits transmission of reset pulses onto line 127 so that bridge 41 is deconditioned and alternate cathodic pulses do not appear.

Provision may be made for switching between different preset values of ta, tac and tc in the course of generation of the control waveform, by duplicating the timers TA, TAC and TC and providing selective switching similar to the bistable circuit 115 and its associated gates 108 and 109 for each pair of timers. It is envisaged that greater flexibility for generation of the control waveform may be provided by providing the timers in triplicate with appropriate switching facility.

Using a straight bar 31 whose undersurface has a rectangular configuration a striped effect is achieved in the form of continuous, but varying metallic dispersion introduced into the surface of a ribbon of flat glass. For example under experimental conditions with a rectangular electrode bar of mild steel and with a body 36 of molten indium clinging to that bar a striped glass was made. Details of the operating conditions are as follows:-

| | |
|---|---|
| Ribbon speed | 30 meters/hour (0.083 mm/10 ms) |
| Ribbon width | 200 mm |
| Ribbon temperature at electrode position | 720°C |
| Bath atmosphere composition | 10% hydrogen/90% nitrogen |
| Electrode Characteristics Pool composition | 100% indium |
| Bar material | Mild steel |
| Bar shape | Straight bar (150 mm × 50 mm) |
| Bar width (across Bath) | 150 mm |
| Area of bottom of bar (equal to pool/glass interfacial area) | 75 cm$^2$ (7.5 × 10$^{-3}$m$^2$) |

In the following Tables, Table I gives the characteristics of the waveform employed which is as illustrated in FIG. 3 with each cathodic pulse present. In both Examples 1 and 2 the anodic treatments are comparable; during the anodic pulses indium ions migrate into the glass. In Example 2, the cathodic treatment is more than 3 times that of Example 1 thereby giving a stronger cathodic reduction of the indium ions introduced in each anodic pulse.

The intervals between successive groups of anodic and cathodic pulses are the same, that is time tca1 is equal to time tca2, both being 1180 ms. All the glass received five successive anodic and cathodic treatments as it passed beneath the molten indium body and the resulting solar control properties are set out in Table II.

TABLE I

| Waveform characteristics | Example 1 | Example 2 |
|---|---|---|
| Anodic peak voltage (Va) | 212 V | 212 V |
| Anodic pulse duration (ta) | 10 ms | 10 ms |
| Anodic coulombs/pulse (measured) | 0.87c | 0.98c |
| Anodic coulombs/m$^2$ of glass/pulse | 116c/m$^2$ | 131c/m$^2$ |
| Anodic-cathodic interval (tac) | 10 ms | 10 ms |
| Cathodic peak voltage (Vc) | 44V | 150 V |
| Cathodic pulse duration (tc) | 10 ms | 10 ms |
| Cathodic coulombs/pulse (measured) | 0.18 c | 0.76 c |
| Cathodic coulombs/m$^2$ of glass/pulse | 24c/m$^2$ | 102c/m$^2$ |
| First cathodic-anodic interval (tca1) | 1180 ms | 1180 ms |
| Second cathodic-anodic interval (tca2) | 1180 ms | 1180 ms |
| Cathodic treatment % (of anodic) | 21% | 78% |

TABLE II

| Product characteristics | Example 1 | Example 2 |
|---|---|---|
| Total anodic treatment applied | 580 c/m$^2$ | 655 c/m$^2$ |

TABLE II-continued

| Product characteristics | Example 1 | Example 2 |
|---|---|---|
| Transmission colour | Yellow | Grey/brown |
| Solar Control properties | | |
| Average White Light Transmission | 54% | 24% |
| Average Solar Radiant Reflection | 10% | 11% |
| Average Solar Radiant Absorption | 33% | 52% |
| Average Direct Solar Radiant Transmission | 57% | 37% |

Monovalent indium ions which migrate into the glass during each anodic pulse disproportionate in the glass to produce indium atmos, and trivalent indium ions which are concentrated towards the glass surface during the next cathodic pulse are reduced in the surface to indium atoms. The much stronger cathodic treatment in Example 2 therefore results in an enhancement of the solar radiant absorption and direct solar radiant transmission properties of the glass as shown by the figures in Table II.

under production conditions a product with a striped appearance was produced. The pattern introduced into the glass includes clear stripes; darker stripes which have received five successive anodic and cathodic treatments, and lighter stripes which have received four successive anodic and cathodic treatments. The glass was produced using a copper electrode bar 31 of rectangular form and having a rectangular underface and the molten metal body being of copper/lead alloy which at the operating temperature of 720°C has the composition 2% copper and 98% lead. Operating conditions were as follows:

| | |
|---|---|
| Ribbon speed | 365 meters/hour (1.0 mm/10 ms) |
| Ribbon width | 3,300 mm |
| Ribbon thickness | 6 mm |
| Ribbon temperature at electrode position | 720°C |
| Bath atmosphere composition | 10% hydrogen / 90% nitrogen |
| Electric Characteristics | |
| Pool Composition | 2% copper / 98% lead |
| Bar material | Copper |
| Bar shape | Straight bar (2745 mm × 51 mm) |
| Bar width (across bath) | 2745 mm |
| Area of bottom of bar (equal to pool/glass interfacial area) | 1,400 cm² (1.4 × 10⁻¹ m²) |

The characteristics of the waveform are set out in Table III and the characteristics of the product are set out in Table IV which indicates that the darker stripes which had five successive anodic and cathodic treatments are of blue/green colour when viewed in transmitted light and the lighter stripes which has received four successive anodic and cathodic treatments are of blue/pink colour.

TABLE III

| Waveform Characteristics | Example 3 |
|---|---|
| Anodic peak voltage (Va) | 145 V |
| Anodic pulse duration (ta) | 10 ms |
| Anodic coulombs/pulse (measured) | 12.8 c |
| Anodic coulombs/m² of glass/pulse | 92 c/m² |
| Anodic-cathode interval (tac) | 10 ms |
| Cathodic peak voltage (Vc) | 120 V |
| Cathodic pulse duration (tc) | 10 ms |
| Cathodic coulombs/pulse (measured) | 11.2 c |
| Cathodic coulombs/m² of glass/pulse | 80 c/m² |
| First cathodic-anodic interval (tca1) | 80 ms |
| Second cathodic-anodic interval (tca2) | 80 ms |
| Cathodic treatment % (of anodic) | 87% |

TABLE IV

| Product characteristics | Example 3 | |
|---|---|---|
| Average total anodic treatment applied | 420 c/m² | |
| Transmission colours | (a) | Blue/green (4.5 mm) (Probably 5 treatments) |
| | (b) | Blue pink (4.5 mm) (Probably 4 treatments) |
| | (c) | Clear (2.0 mm) (Probably due to cathodic at upstream edge) |
| Solar control properties | | |
| Average White Light Transmission | 49% | |
| Average Solar Radiant Reflection | 13% | |
| Average Solar Radiant Absorption | 34% | |
| Average Direct Solar Radiant transmission | 53% | |

During each of the anodic pulses ta cationic migration of metal ions takes place from a molten metal body 36 into the glass surface. The amount of metal migrating may be affected by the amount of oxygen present in the molten metal body. This may be of more significance when an alloy is employed, for example, a copper/lead alloy, in varying somewhat the relative proportions of the two metals of the alloy which enter the glass surface.

When metal ions have entered the glass at the temperature of operation, for example, in the range 700°C to 800°C, interdiffusion takes place in the surface layer of the glass up to the end of the interval tac, such interdiffusion takes metal ions deeper into the glass and sodium ions to the glass surface. By the time the cathodic pulse tc is applied from the same molten metal body there will be sufficient concentration of sodium ions existing in the surface layer of the glass to effect a cationic flow from the glass surface into the molten metal body wherein the sodium ions are discharged to sodium metal which exists at the glass/metal interface and thereby produces reducing conditions at that interface sufficient to reduce the metal ions previously introduced so that they revert in the glass to their initial state of metal atoms and produce the metallic dispersion in the glass while the molten metal is still in contact with the glass. The next anodic pulse applied generally results in introduction into the glass of further colouring metal ions derived from the material of the molten pool. However, in some cases, clear bands are also observed; these are believed to result from transfer back into the glass of sodium built up in the upstream edge of the pool during the cathodic treatment.

As already shown, with reference to Examples 1 to 3, the amplitude, duration and temporal spacing of the pulses of the waveform are regulated to control the metallic dispersion. As well as producing reducing conditions at the glass/metal interface, the presence of cathodically released sodium in the molten metal body is thought to be effective to de-oxidise the molten metal body, thus improving the efficiency and uniformity of treatment of the glass and minimising the existence of streaks in the metallic dispersion which are thought might be due to the presence of some oxide in the molten metal body. Also the possibility of oxide vapourising from the molten metal body into the headspace over the bath is reduced.

Additionally de-oxidising of the molten metal body reduces the possibility of oxide existing at the interface between the electrode bar 31 and the molten metal body 36. This means that the wetting of the molten metal onto the bar 31 may be considerably improved as has been found in the case of the use of indium with a mild steel bar as in Examples 1 and 2. The cathodic pulses prevent oxide films building up on the surface of the bar. Additionally by applying both anodic and cathodic treatment from the same molten body comprising a metal, e.g. indium or bismuth, which if oxidised can introduce strongly polarising ions into the glass, e.g. trivalent ions such as $In^{3+}$ or $Bi^{3+}$ polarisation problems at the glass/metal interface are minimised thereby producing greater consistency of electrochemical treatment.

Further an improvement has been shown in the consistency of electrochemical reduction of metal ions in the glass surface and consequently darker glasses and higher reflectivities and better solar control properties have been observed. From metal alloy bodies, for example, copper/lead bodies, a greater range of transmission products has been produced.

Further the supply of anodic and cathodic pulses in sequence to the same molten metal body has resulted in less movement of the molten metal than when using anodic pulses only.

This also improves uniformity of treatment and is likely to reduce any distortion introduced into the glass by the molten body. In practice, the weight of the shaped molten body may result in some slight distortion of the glass surface, especially when the glass is at high temperature, for example above 800°C. This distortion, which may occur even in the absence of an electric current, may in itself be decorative, and may enhance the decorative effect of the ions introduced into the glass.

A further advantage which has been observed is that the bottom surface of the glass which has been in contact with the molten metal bath has improved weathering characteristics; this is believed to be due to the fact that less sodium is released at the interface between the bottom surface of the ribbon of glass and the molten metal bath.

The invention can also be applied to methods of producing flat glass having a metallic dispersion of predetermined intensity in the form of a pattern in the glass surface. Uniformity of production of the pattern with better definition has been observed.

Figure 6:
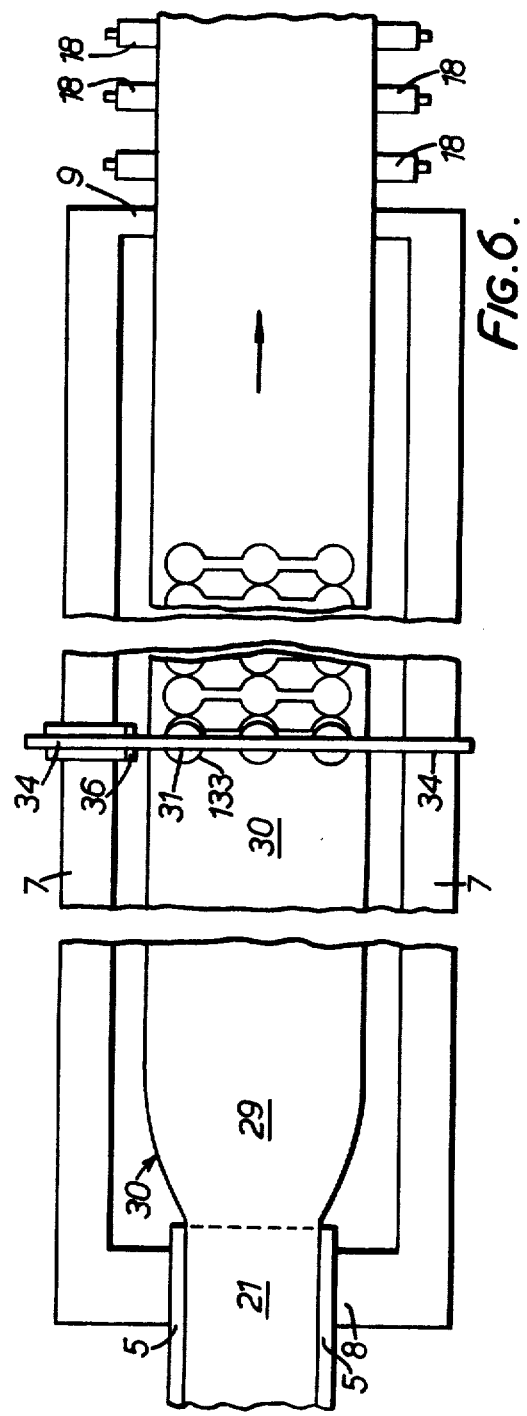
FIG. 6 is a plan view of apparatus similar to FIG. 1 for producing patterned float glass.

FIG. 6 is a plan view of apparatus of the kind illustrated in FIG. 1 but showing the use of an electrode bar 31 which is shaped in such a way that the molten metal body 36 clinging to the shaped undersurface of the bar has itself the configuration of the bar comprising a series of discs 134 which are spaced apart and are joined by straight bridging pieces 135. This is illustrated to a larger scale in FIG. 7. The beam 34 from which the shaped electrode bar 133, 134 is suspended is connected to a switched electrical supply circuit of the same kind as described with reference to FIGS. 4 and 5 and a waveform of anodic and cathodic pulses, of the kind illustrated in FIG. 3, is supplied.

Figure 7:
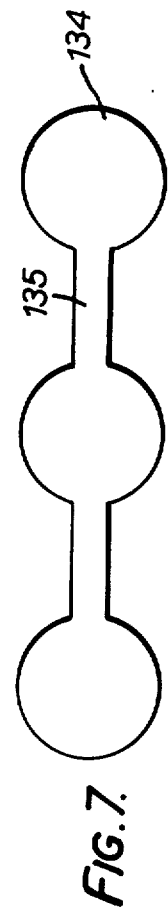
FIG. 7 illustrates a shaped electrode bar for use in the apparatus of FIG. 6, FIGS. 8 to 11 are simplified illustrations of patterns produced in flat glass using the electrode bar of FIG. 7.
Figure 8:
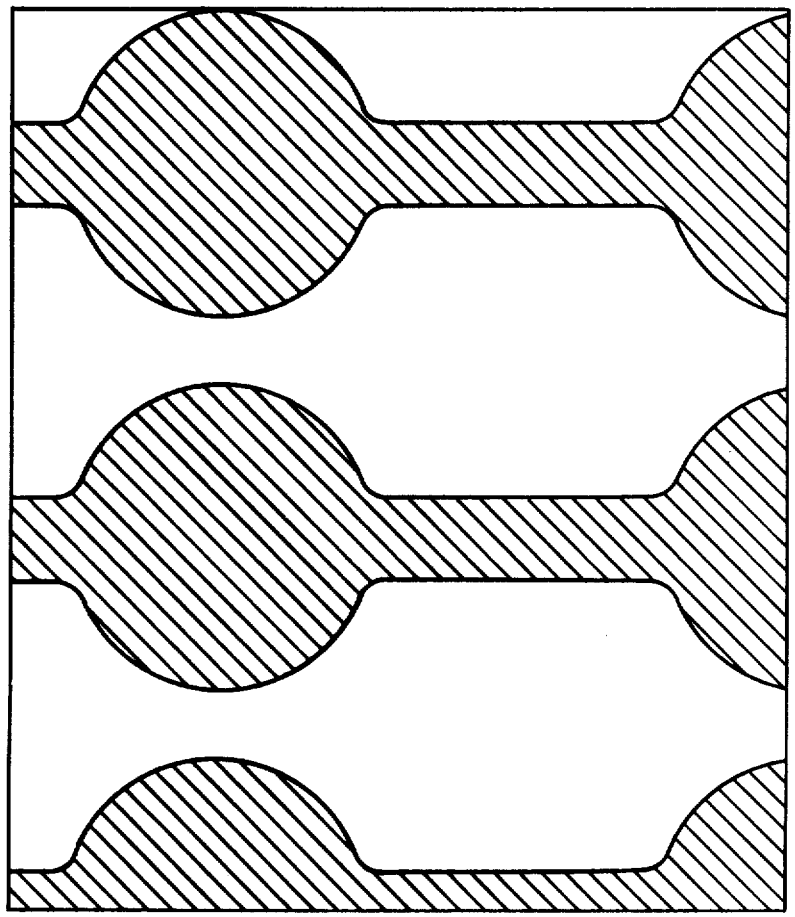

The ribbon of glass 30 advances beneath the shaped electrode bar and the intervals between the anodic pulses ta are timed relative to the speed of advance of the ribbon in such a way that a repetitive series of contiguous patterns in the shape of the bar of FIG. 7 are produced in the glass. In the illustration of this method according to the invention in FIGS. 6 and 7 the bar comprises only three discs connected by two bridging pieces but on the production plant the bar is longer with many more discs extending right across the ribbon of glass. The timing may be such that, as suggested in FIG. 6, the pattern elements are contiguous; or the timing may be such that pattern elements are spaced apart as illustrated in FIG. 8.

The effect of cathodic treatment in enhancing decorative indium products has been observed in the course of experimental work using an electrode having a configuration of the kind illustrated in FIGS. 6 and 7 and operating conditions as follows:-

| | |
|---|---|
| Ribbon speed | 30 m/h (0.083 mm/10 ms) |
| Ribbon width | 200 mm |
| Ribbon thickness | 6.0 mm |
| Ribbon temperature at electrode position | 720°C |
| Bath atmosphere composition | 10% hydrogen / 90% nitrogen |
| Electrode characteristics | |
| Pool composition | 100% indium |
| Bar material | Mild steel |
| Bar shape | Disc and bar (two 50 mm diameter discs joined by a 50 mm × 13 mm bar) |
| Bar width (across bath) | 150 mm |
| Area of bottom of bar (equal to pool/glass interfacial area) | 46 cm² (4.6 × 10⁻³ m²) |

Figure 9:
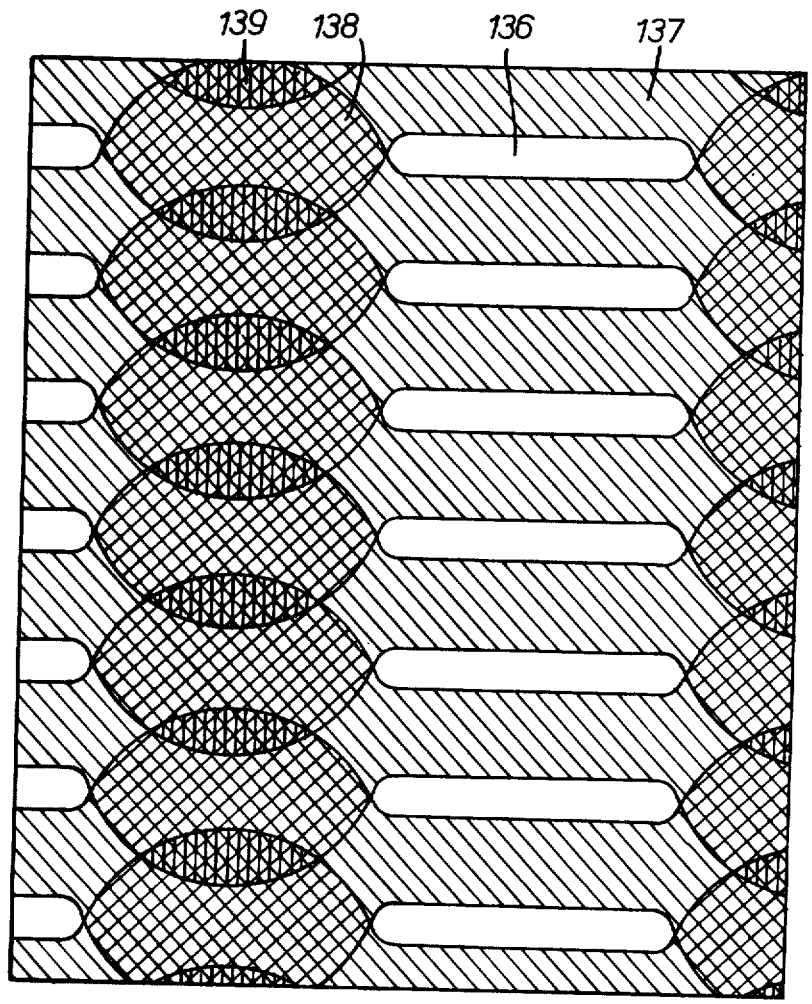
Figure 10:
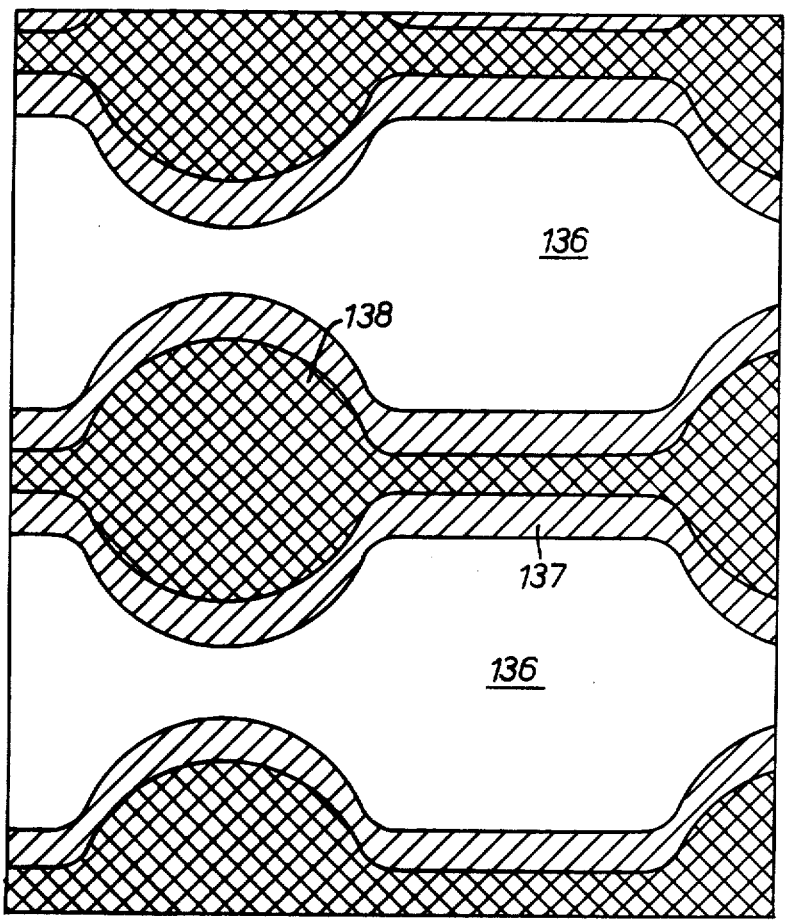

The resulting pattern produced in the glass was as illustrated in FIGS. 9 and 10 having clear areas and areas of single, double and triple treatment. Table V given below, sets out the waveform characteristics for four Examples 4 to 7 and the characteristics of the product are given in Table VI.

In Examples 4 and 5 the pattern introduced into the glass is as illustrated in FIG. 9. Example 4 has no cathodic reduction treatment whereas Example 5 has a cathodic treatment which is 60% of the anodic treatment. The greater density of the colours produced in the pattern is exemplified by the white light transmission figures.

Examples 6 and 7 relate to patterns as illustrated in FIG. 10. There is no cathodic treatment in Example 6 and the effect in Example 7 of the cathodic treatment which is 56% of the anodic treatment is shown by the decreased white light transmission in the double treatment areas.

These Examples show how the cathodic treatment enhances the contrast between the single, double and triple treatment areas. Thus in Example 4 which receives no cathodic treatment the contrast between double and triple treatment areas is represented by a 60% − 56% = 4% difference in white light transmission. In Example 5 with the same anodic treatment and a cathodic treatment which is 60% of the anodic treatment the improvement in contrast is represented by a 60% − 44% = 16% difference in white light transmission between double and triple treatment areas.

Similarly Examples 6 and 7 show with no cathodic treatment a 5% difference in white light transmission between single and double treatment areas which is increased to a 22% difference with a cathodic treatment which is 56% of the anodic treatment.

TABLE V

| Waveform characteristics | Example 4 | Example 5 | Example 6 | Example 7 |
| --- | --- | --- | --- | --- |
| Anodic peak voltage (Va) | 85 V | 85 V | 85 V | 85 V |
| Anodic pulse duration (ta) | 30 ms | 30 ms | 40 ms | 40 ms |
| Anodic coulombs/pulse (measured) | 0.68 c | 0.72 c | 0.90 c | 0.97 c |
| Anodic coulombs/$m^2$ of glass/pulse | 147 c/$m^2$ | 157 c/$m^2$ | 195 c/$m^2$ | 211 c/$m^2$ |
| Anodic-cathodic interval (tac) | 10 ms | 10 ms | 90 ms | 90 ms |
| Cathodic peak voltage (Vc) | 0 | 130 V | 0 | 176 V |
| Cathodic pulse duration (tc) | 10 ms | 10 ms | 10 ms | 10 ms |
| Cathodic coulombs/pulse (measured) | 0 | 0.43 c | 0 | 0.54 c |
| Cathodic coulombs/$m^2$ of glass/pulse | 0 | 94 c/$m^2$ | 0 | 118 c/$m^2$ |
| First cathodic-anodic interval (tca1) | 1890 ms | 1890 ms | 900 ms | 900 ms |
| Second cathodic-anodic interval (tca2) | 1890 ms | 1890 ms | 6700 ms | 6700 ms |
| Cathodic treatment % of anodic | 0% | 60% | 0% | 56% |

TABLE VI

| Product characteristics | Example 4 | Example 5 | Example 6 | Example 7 |
| --- | --- | --- | --- | --- |
| Total anodic treatment applied | | | | |
| Single treatment areas | 147 c/$m^2$ | 157 c/$m^2$ | 195 c/$m^2$ | 211 c/$m^2$ |
| Double treatment areas | 294 c/$m^2$ | 314 c/$m^2$ | 390 c/$m^2$ | 422 c/$m^2$ |
| Triple treatment areas | 441 c/$m^2$ | 471 c/$m^2$ | — | — |
| White Light Transmissions | | | | |
| No treatment areas (clear glass) | 89% | 89% | 89% | 89% |
| Single treatment areas | 80% | 78% | 68% | 68% |
| Double treatment areas | 60% | 60% | 63% | 46% |
| Triple treatment areas | 56% | 44% | — | — |
| Transmission colours | | | | |
| Single treatment areas | Pink | Yellow | Green + Pink | Pink |
| Double treatment areas | Pink | Yellow | Green + Pink | Brown |
| Triple treatment areas | Yellow | Brown | — | — |

Similar results were achieved under production conditions in which operating conditions using a mild steel bar with a molten indium body 36 are as follows:

Ribbon speed : 365 m/hour (1.0 mm/10 ms)
Ribbon width : 3,300 mm
Ribbon thickness : 6 mm
Ribbon temperature at electrode position : 720°C
Bath atmosphere composition : 10% hydrogen 90% nitrogen.

Electrode characteristics
Pool composition     100% indium
Bar material     Mild steel
Bar shape     Disc and bar (50 mm dia. discs joined by 50 mm × 13 mm bars)
Bar width (across bath)     3,020 mm
Area of bottom of bar (equal to pool/glass interfacial area)     790 $cm^2$ (7.9 × $10^{-2} m^2$)

Results of three examples of operation are set out in Tables VII and VIII. The pattern illustrated in FIG. 8 is the pattern produced in the glass of Example 8.

FIG. 10 is a diagrammatic illustration of the pattern introduced into the glass of Example 9. The pattern comprises clear areas 136 of large extent, areas 137 which have received a single treatment and areas 138 which have received a double treatment. The transmission colours and different white light transmissions are set out in Table VIII.

FIG. 9 is a diagrammatic illustration of the pattern introduced into the glass of Example 10. As well as clear areas 136, areas of single treatment 137 and areas of double treatment 138, there are darker areas 139 which have received a triple treatment.

Figure 11:
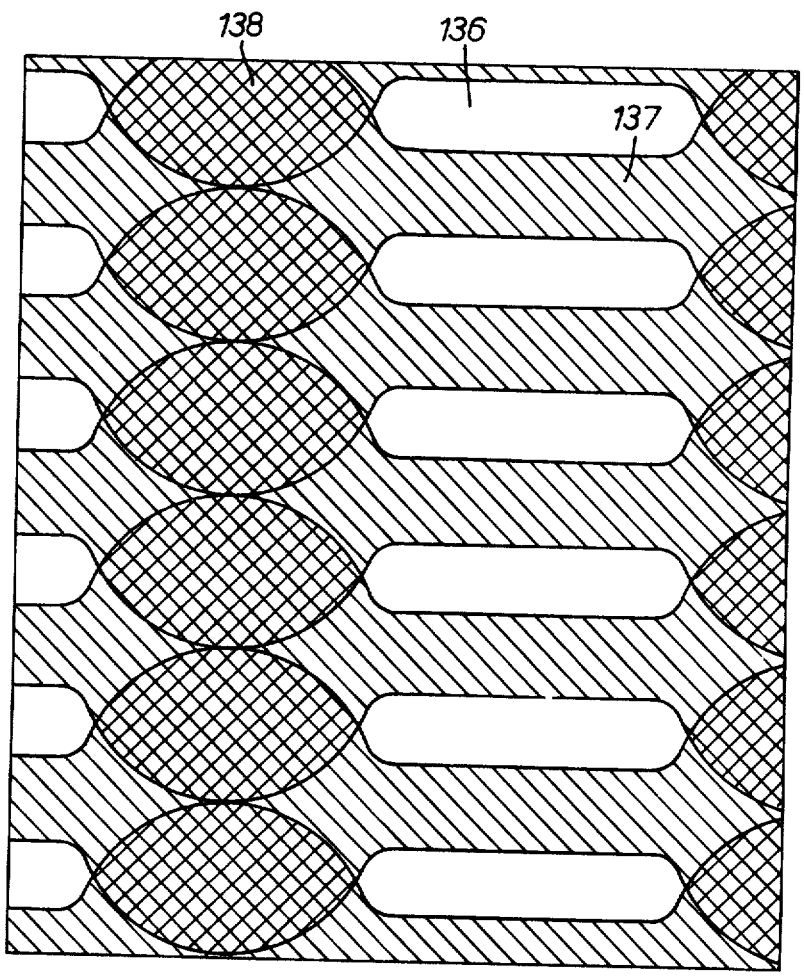

Examples 11 and 12 of operation in this manner are respectively examples of such a pattern as FIG. 11. In Example 11 there is no cathodic reduction treatment and in Example 12 there is a cathodic treatment produced with a modified waveform when the switch 122 of FIG. 5 is in its position connecting the line 121 from the bistable circuit 120 to the NAND gate 119. This

TABLE VII

| Waveform Characteristics | Example 8 | Example 9 | Example 10 |
|---|---|---|---|
| Anodic peak voltage (Va) | 185 V | 185 V | 185 V |
| Anodic pulse duration (ta) | 20 ms | 10 ms | 10 ms |
| Anodic coulombs/pulse (measured) | 22.4 c | 11.2 c | 11.2 c |
| Anodic coulombs/$m^2$ of glass/pulse | 284 c/$m^2$ | 142 c/$m^2$ | 142 c/$m^2$ |
| Anodic-cathodic interval (tac) | 10 ms | 10 ms | 10 ms |
| Cathodic peak voltage (Vc) | 45 V | 60 V | 80 V |
| Cathodic pulse duration (tc) | 10 ms | 10 ms | 10 ms |
| Cathodic coulombs/pulse (measured) | 2.4 c | 2.6 c | 4.8 c |
| Cathodic coulombs/$m^2$ of glass/pulse | 31 c/$m^2$ | 33 c/$m^2$ | 61 c/$m^2$ |
| First cathodic-anodic interval ($tca_1$) | 570 ms | 40 ms | 180 ms |
| Second cathodic-anodic interval ($tca_2$) | 570 ms | 600 ms | 180 ms |
| Cathodic treatment % (of anodic) | 11% | 23% | 43% |

TABLE VIII

| Product characteristics | Example 8 | Example 9 | Example 10 |
|---|---|---|---|
| Total anodic treatment applied | | | |
| Single treatment areas | 284 c/$m^2$ | 142 c/$m^2$ | 142 c/$m^2$ |
| Double treatment areas | — | 284 c/$m^2$ | 284 c/$m^2$ |
| Triple treatment areas | — | — | 426 c/$m^2$ |
| White Light Transmissions | | | |
| No treatment areas (clear glass) | 87% | 87% | 87% |
| Single treatment areas | 69% | 79% | 79% |
| Double treatment areas | — | 69% | 69% |
| Triple treatment areas | — | — | 59% |
| Transmission colours | | | |
| Single areas | Pink/yellow | Pink | Pink |
| Double treatment areas | — | Green | Green |
| Triple treatment areas | — | — | Green/brown |

FIG. 11 illustrates another pattern produced with the shaped electrode bar of FIGS. 6 and 7 to produce areas of clear glass 136, areas of single treatment 137, and areas of double treatment 138 in the pattern-forming distribution of metallic dispersion produced in the glass surface.

A copper electrode bar 31 with a molten body of copper/lead alloy was employed in the experimental plant and the general operating conditions were as follows:

means that alternate cathodic pulses are omitted from the waveform. In FIG. 3 the second cathodic pulse tc2 shown in dotted lines is not present.

TABLE IX

| Waveform characteristics | Example 11 | Example 12 |
|---|---|---|
| Anodic peak voltage (Va) | 125 V | 105 V |
| Anodic pulse duration (ta) | 30 ms | 30 ms |
| Anodic coulombs/pulse (measured) | 0.92 C | 0.92 C |
| Anodic coulombs/$m^2$ of glass/ | | |

| | |
|---|---|
| Ribbon speed | 23 m/hour (0.064 mm/19 ms) |
| Ribbon width | 235 mm |
| Ribbon thickness | 6.5 mm |
| Ribbon temperature at electrode position | 720°C |
| Bath atmosphere composition | 10% hydrogen / 90% nitrogen |
| Electrode characteristics | |
| Pool composition | 2% copper / 98% lead |
| Bar material | Copper |
| Bar shape | Disc and bar (two 50 mm diameter discs joined by a 50 mm × 13 mm bar) |
| Bar width (across bath) | 150 mm |
| Area of bottom of bar (equal to pool/glass interfacial areas) | 46 $cm^2$ (4.6 × $10^{-3}$ $m^2$). |

TABLE IX-continued

| Waveform characteristics | Example 11 | Example 12 |
| --- | --- | --- |
| pulse | 200 c/m² | 200 c/m² |
| Anodic-cathodic interval (tac) | 10 ms | 10 ms |
| Cathodic peak voltage (Vc) | 0 | 0/150 |
| Cathodic pulse duration (tc) | 20 ms | 30 ms |
| Cathodic coulombs/pulse (measured) | 0 | 0/1.38 c |
| Cathodic coulombs/m² of glass/pulse | 0 | 0/300 c/m² |
| First cathodic-anodic interval (tca1) | 4000 ms | 4000 ms |
| Second cathodic-anodic interval (tca2) | 4000 ms | 4000 ms |
| Cathodic treatment % (of anodic) | 0% | 0/150% |

TABLE X

| Product characteristics | Example 11 | Example 12 |
| --- | --- | --- |
| Total anodic treatment applied | | |
| Single treatment areas | 200 c/m² | 200 c/m² |
| Double treatment areas | 400 c/m² | 400 c/m² |
| White Light Transmissions | | |
| No treatment areas (clear glass) | 89% | 89% |
| Single treatment areas | | |
|   anodic only | 60% | 71% |
|   anodic + cathodic | — | 81% |
| Double treatment areas | | |
|   anodic only | 43% | — |
|   anodic only then anodic + cathodic | — | 67% |
|   anodic + cathodic then anodic only | — | 67% |
| Transmission colours | | |
| Single treatment areas | | |
|   anodic only | Grey | Pink |
|   anodic + cathodic | — | Grey/Pink |
| Double treatment areas | | |
|   anodic only | Grey | — |
|   anodic only then anodic + cathodic | — | Pink/Grey |
|   anodic + cathodic then anodic only | — | Pink |

Table IX gives details of waveform characteristics for these comparative treatments and Table X indicates that with anodic treatment only, that is in Example 11, the glass exhibits only a grey transmission colour; whereas with anodic followed by a second anodic and then a cathodic treatment as in Example 12 enhanced pink and grey/pink transmission colours developed.

Figure 12:
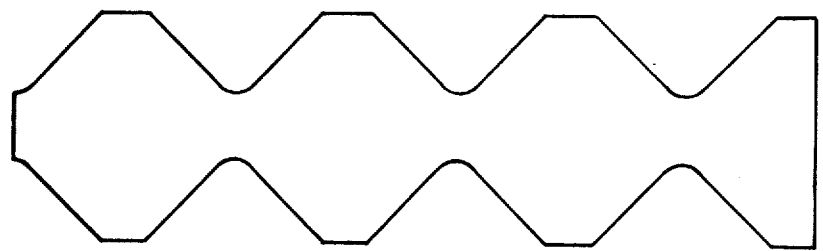
FIG. 12 illustrates another shaped electrode bar for use in apparatus of FIG. 6, FIGS. 13 and 14 are simplified illustrations of patterns produced in flat glass using the electrode bar of FIG. 12.

Further experimental and production work produced results with a differently shaped electrode bar comprising a connected series of end-to-end octagons as illustrated in FIG. 12. This Figure shows a short length of such a bar as was employed on the production plant.

Figure 13:
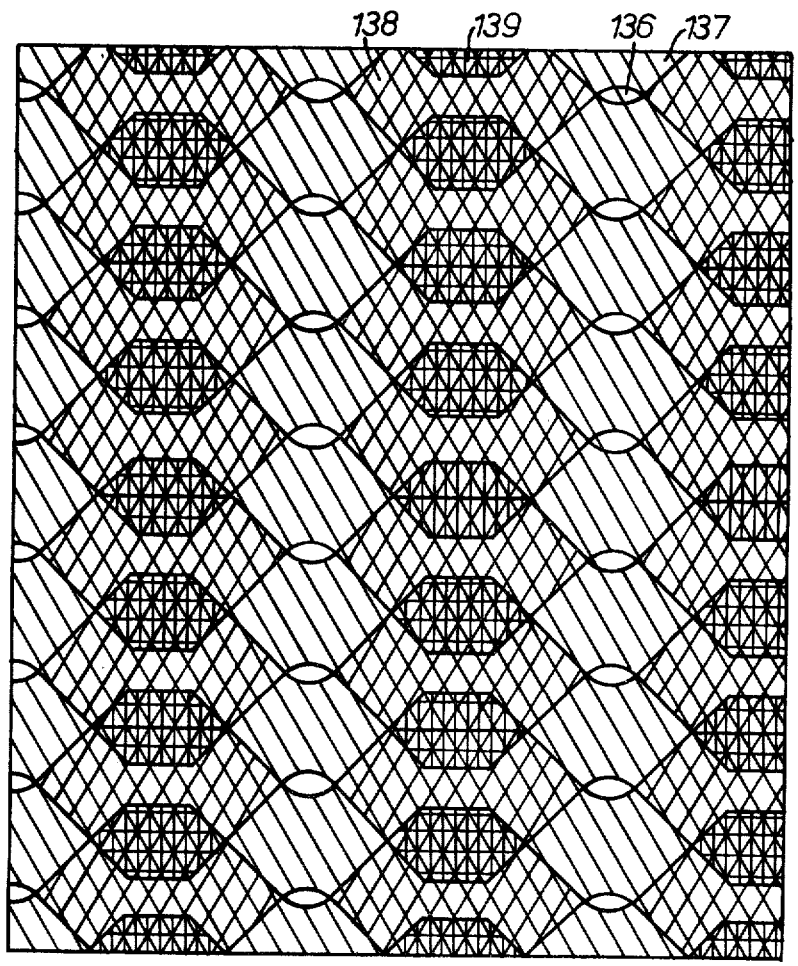

Decorative copper/lead products were produced under experimental conditions using such an electrode to engender a pattern of the kind illustrated in FIG. 13, firstly with no cathodic reduction and then with varying percentages of cathodic treatment. The general operating conditions were as follows:

| | |
| --- | --- |
| Ribbon speed | 23 m/h (0.064 mm/10 ms) |
| Ribbon width | 235 mm |
| Ribbon thickness | 6.5 mm |
| Ribbon temperature at electrode position | 720°C |
| Bath atmospere composition | 10% hydrogen / 90% nitrogen |
| Electrode characteristics | |
| Pool composition | 2% copper / 98% lead |
| Bar material | Copper |
| Bar shape | Octagon (three octagons, each octagon 50 mm between opposite 10 mm sides, with adjoining 10 mm sides, 90° angles slightly radiused). |
| Bar Width (across bath) | 150 mm |
| Area of bottom of bar (equal to pool/glass interfacial area) | 50 cm² (5.0 × 10⁻³ m²). |

The waveform characteristics and product characteristics are set out in Tables XI and XII.

TABLE XI

| Waveform characteristics | Example 13 | Example 14 | Example 15 |
| --- | --- | --- | --- |
| Anodic peak voltage (Va) | 130 V | 130 V | 126 V |
| Anodic pulse duration (ta) | 40 ms | 30 ms | 30 ms |
| Anodic coulombs/pulse (measured) | 1.0 c | 1.0 c | 1.0 c |
| Anodic coulombs/m² of glass/pulse | 200 c/m² | 200 c/m² | 200 c/m² |
| Anodic-cathodic interval (tac) | 10 ms | 10 ms | 10 ms |
| Cathodic peak voltage (Vc) | 0 | 122 v | 155 v |
| Cathodic pulse duration (tc) | 20 ms | 20 ms | 20 ms |
| Cathodic coulombs/pulse (measured) | 0 | 0.8 c | 1.0 c |
| Cathodic coulombs/m² of glass/pulse | 0 | 160 c/m² | 200 c/m² |
| First cathodic - anodic interval (tca1) | 2700 ms | 2700 ms | 2700 ms |
| Second cathodic-anodic interval (tca2) | 2700 ms | 2700 ms | 2700 ms |
| Cathodic treatment % (of anodic) | 0% | 80% | 100% |

TABLE XII

| Product Characteristics | Example 13 | Example 14 | Example 15 |
| --- | --- | --- | --- |
| Total anodic treatment applied | | | |
| Single treatment areas | 200 c/m² | 200 c/m² | 200 c/m² |
| Double treatment areas | 400 c/m² | 400 c/m² | 400 c/m² |
| Triple treatment areas | 600 c/m² | 600 c/m² | 600 c/m² |
| White Light transmissions | | | |
| No treatment areas (clear glass) | 88% | 88% | 88% |
| Single treatment areas | 58% | 70% | 69% |

TABLE XII-continued

| Product Characteristics | Example 13 | Example 14 | Example 15 |
| --- | --- | --- | --- |
| Double treatment areas | 39% | 64% | 65% |
| Triple treatment areas | 34% | 57% | 56% |
| Transmission colours | | | |
| Single treatment areas | Yellow (turbid) | Grey | Pink |
| Double treatment areas | Pink/grey (turbid) | Grey | Pink |
| Triple treatment areas | Grey/Pink | Grey | Pink |

In Example 13 there is no cathodic treatment of the glass after an anodic treatment to introduce copper and lead ions into the glass surface. The transmission colours produced were especially turbid in the single and double treatment areas 137 and 138 of the pattern and, because of this turbidity there was low white light transmission through all parts of the pattern.

A cathodic treatment which is 80% of the anodic treatment was applied in Example 14, and a cathodic treatment 100% of the anodic treatment in Example 15. An improvement in colour developed in the glass was evident from turbid yellow of Example 13 through the grey of Example 14 to the pink of Example 15.

Also the contrast between different areas of the pattern increased with increased cathodic treatment. This is illustrated in Table XII with reference to white light transmission through the areas of double and triple treatment. In Example 13 there is a 5% difference, increasing to 7% in Example 14 and to 9% in Example 15.

Figure 14:
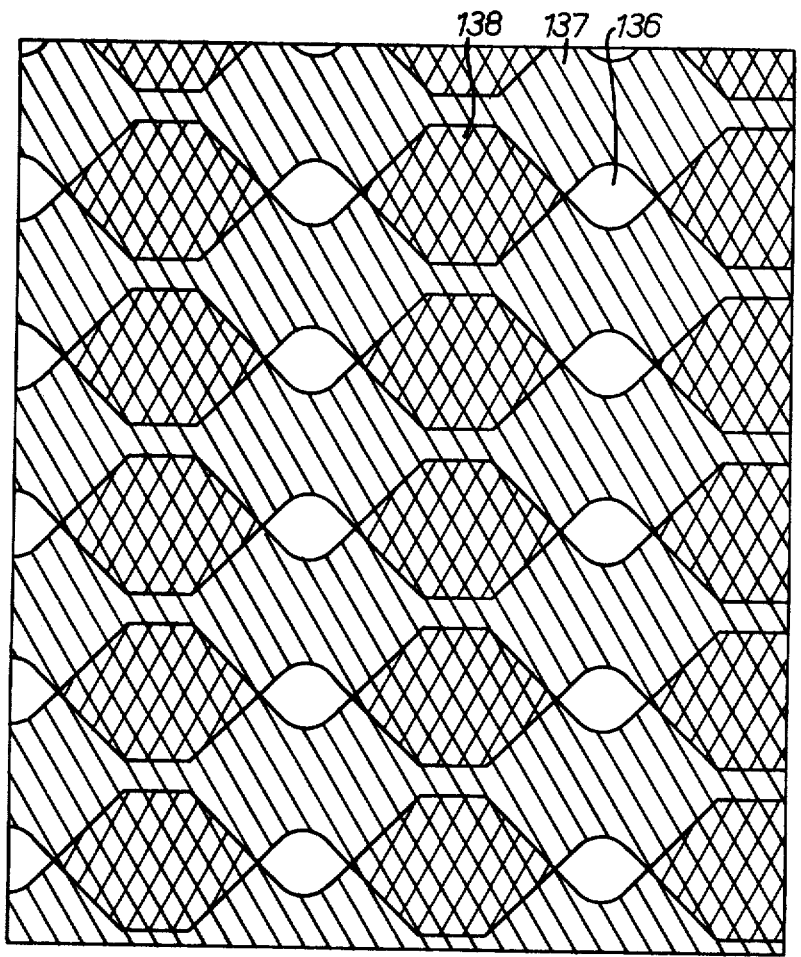

Decorative copper/lead products were produced under production conditions using such an electrode bar to engender patterns in the glass of the kind illustrated in FIGS. 13 and 14, operating conditions were as follows:

| | |
| --- | --- |
| Ribbon speed | 365 m/h (1.0 mm/10 ms) |
| Ribbon width | 3,300 mm |
| Ribbon thickness | 6 mm |
| Ribbon temperature at electrode position | 720°C |
| Bath atmosphere composition | 10% hydrogen / 90% nitrogen |
| Electrode characteristics | |
| Pool composition | 2% copper / 98% lead |
| Bar material | Copper |
| Bar shape | Octagon (octagons, each octagon 50 mm between opposite 10 mm sides, with adjoining 10 mm sides, 90° angles slightly radiused). |
| Bar width (across bath) | 2,745 mm |
| Area of bottom of bar (equal to pool/glass interfacial area) | 1,000 cm² (1.0 × 10⁻¹ m²). |

The glass of Example 16 in Tables XIII and XIV set out below had the pattern of FIG. 14 and with a cathodic treatment 70% of the anodic treatment clearly defined single treatment areas 137 and doubule treatment areas 138 were observed with a grey colouration. With a higher anodic treatment in Example 17 a cathodic treatment 93% of the anodic treatment, and different timing of the applied waveform, the pattern of FIG. 13 was produced with areas 137 of single treatment, areas 138 of double treatment and areas 139 of triple treatment. Clear pattern definition was achieved and a pinkish transmission colour in each of the treated areas.

TABLE XIII

| Waveform characteristics | Example 16 | Example 17 |
| --- | --- | --- |
| Anodic peak voltage (Va) | 185 v | 135 v |
| Anodic pulse duration (ta) | 10 ms | 20 ms |
| Anodic coulombs/pulse (measured) | 12.2 c | 19.4 c |
| Anodic coulombs/m² of glass/pulse | 122 c/m² | 194 c/m² |
| Anodic-cathodic interval (tac) | 10 ms | 10 ms |
| Cathodic peak voltage (Vc) | 120 V | 125 V |
| Cathodic pulse duration (tc) | 10 ms | 20 ms |
| Cathodic coulombs/pulse (measured) | 8.5 c | 18 c |
| Cathodic coulombs/m² of glass/pulse | 85 c/m² | 180 c/m² |
| First cathodic-anodic interval (tca1) | 240 ms | 160 ms |
| Second cathodic-anodic interval (tca2) | 240 ms | 160 ms |
| Cathodic treatment % (of anodic) | 70% | 93% |

TABLE XIV

| Product characteristics | Example 16 | Example 17 |
| --- | --- | --- |
| Total anodic treatment applied | | |
| Single treatment areas | 122 c/m² | 194 c/m² |
| Double treatment areas | 244 c/m² | 388 c/m² |
| Triple treatment areas | — | 582 c/m² |
| White Light transmissions | | |
| No treatment areas (clear glass) | 87% | 87% |
| Single treatment areas | 79% | 78% |
| Double treatment areas | 74% | 71% |
| Triple treatment areas | — | 62% |
| Transmission colours | | |
| Single treatment areas | Grey | Pink |
| Double treatment areas | Grey | Pink |
| Triple treatment areas | — | Pink |

Patterned glass of the kind illustrated in FIG. 13 using the electrode of FIG. 12 was also produced in a series of experimental examples to study the effect of cathodic treatment on decorative lead products. The general operating conditions were as follows:

| | |
| --- | --- |
| Ribbon speed | 23 m/h (0.064 mm/10 ms) |
| Ribbon width | 235 mm |
| Ribbon thickness | 6.5 mm |
| Ribbon temperature at electrode position | 780°C |
| Bath atmosphere composition | 10% hydrogen / 90% nitrogen |
| Electrode characteristics | |
| Pool composition | 100% lead |
| Bar material | Ruthenium (25 × 10⁻⁶ m thick) sprayed on stainless steel (EN56B) |
| Bar shape | Octagon (three octagons, each octagon 50 mm between opposite 10 mm sides, with adjoining 10 mm sides, 90° angles slightly radiused) |
| Bar width (across bath) | 150 mm |
| Area of bottom of bar (equal to pool/glass interfacial area) | 50 cm² (5.0 × 10⁻³ m²). |

The ruthenium coating on stainless steel constituting the electrode bar 31 gave good wetting by lead.

The waveform characteristics employed are set out in Table XV and the product characteristics in Table XVI for three Examples 18, 19 and 20. The anodic treatment was the same in each case but in Example 18 there was no cathodic treatment. In Example 19 the cathodic treatment was 40% of the anodic treatment and in Example 20 the cathodic treatment was 100% of the anodic treatment.

With no cathodic treatment, in Example 18, a very turbid and indistinct pattern resulted especially in the triple treatment areas 139 which had the appearance of being joined together in the form of continuous longitudinal stripes with ill-defined boundaries. With a 40% cathodic treatment definition of the pattern improved and white light transmission values increased. A bronze colour was achieved. A very clearly defined pattern comparable with the diagrammatic illustration of the pattern in FIG. 13 was produced with grey colouration in transmitted light in Example 20 which employed the 100% cathodic treatment.

copper/lead products is illustrated by Examples 21 to 24 set out in Tables XVII and XVIII. The general operating conditions were as follows:

| | |
|---|---|
| Ribbon speed | 23 meters/hour (0.064 mm/10 ms) |
| Ribbon width | 235 mm |
| Ribbon thickness | 6.5 mm |
| Ribbon temperature at electrode position | 780°C |
| Bath atmosphere composition | 10% hydrogen / 90% nitrogen |
| Electrode characteristics | |
| Pool composition | 3% copper / 97% lead |
| Bar material | Copper |
| Bar shape | Wavy, out of phase (each edge 5 mm peak to trough, 50 mm wavelength; maximum distance between edges 50 mm, minimum 40 mm) |
| Bar width (across bath) | 150 mm |
| Area of bottom of bar (equal to pool/glass interfacial area) | 70 cm² (7.0 × 10⁻³ m²). |

In the glass produced by Example 21 the outline of the upstream edge of the electrode bar is clear but there is no distinguishable pattern, there being no ca-

TABLE XV

| Waveform characteristics | Example 18 | Example 19 | Example 20 |
|---|---|---|---|
| Anodic peak voltage (Va) | 101 V | 102 V | 90 V |
| Anodic pulse duration (ta) | 20 ms | 20 ms | 20 ms |
| Anodic coulombs/pulse (measured) | 1.0 c | 1.0 c | 1.0 c |
| Anodic coulombs/m² of glass/pulse | 200 c/m² | 200 c/m² | 200 c/m² |
| Anodic-cathodic interval (tac) | 10 ms | 10 ms | 10 ms |
| Cathodic peak voltage (Vc) | 0 | 57 V | 140 V |
| Cathodic pulse duration (tc) | 10 ms | 10 ms | 10 ms |
| Cathodic coulombs/pulse (measured) | 0 | 0.4 c | 1.0 c |
| Cathodic coulombs/m² of glass/pulse | 0 | 80 c/m² | 200 c/m² |
| First cathodic-anodic interval (tca1) | 2650 ms | 2650 ms | 2650 ms |
| Second cathodic-anodic interval (tca2) | 2650 ms | 2650 ms | 2650 ms |
| Cathodic treatment % (of anodic) | 0% | 40% | 100% |

TABLE XVI

| Product characteristics | Example 18 | Example 19 | Example 20 |
|---|---|---|---|
| Total anodic treatment applied | | | |
| Single treatment areas | 200 c/m² | 200 c/m² | 200 c/m² |
| Double treatment areas | 400 c/m² | 400 c/m² | 400 c/m² |
| Triple treatment areas | 600 c/m² | 600 c/m² | 600 c/m² |
| White Light transmissions | | | |
| No treatment areas (clear glass) | 89% | 89% | 89% |
| Single treatment areas | 58% | 70% | 75% |
| Double treatment areas | 39% | 59% | 70% |
| Triple treatment areas | 35% | 51% | 57% |
| Transmission colours | | | |
| Single treatment areas | Grey/yellow | Bronze | Grey |
| Double treatment areas | Bronze (turbid) | Bronze | Grey |
| Triple treatment areas | Grey (very turbid) | Bronze (turbid) | Grey |

Figure 15:
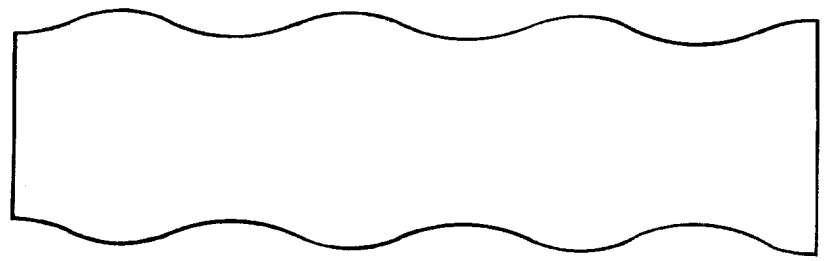
FIG. 15 illustrates yet another shaped electrode of wavy configuration for use in the apparatus of FIG. 6.

Further work was carried out on an experimental scale with an electrode bar having the shape illustrated in FIG. 15, that is a wavy shape with the edges out of phase. The Examples employed a copper bar with a copper/lead alloy at a temperature 780°C so that the composition of the alloy body was 3% copper and 97% lead. The effect of cathodic treatment on solar control thodic reduction. In the glass produced by Example 22 there is a cathodic reduction of 92% of the anodic treatment; this produced an attractive decorative pattern with effective solar control properties as set out in Example 22. In Examples 21 and 22 each part of the glass received from four to six treatments.

Example 23 with no cathodic treatment produced a pattern even less distinct than that produced by Example 21, whereas in Example 24 with a 92% cathodic treatment each part of the of the glass received up to twelve treatments, for example from nine to twelve treatments, producing a denser pattern. Very effective solar radiant reflection absorption and transmission figures were measured in the resulting glass, especially the 30% average solar radiant reflection of the glass of Example 24.

An important advantage resulting from this de-oxidation of the molten body has been observed when flat glass moving at a relatively high speed, for example from 90 to 400 meters per hour, is treated to develop a pattern in the glass. A cathodic treatment to maintain non-oxidising conditions in the molten body, particularly a molten metal body, need only be about 10% or more of the anodic treatment. This may not be sufficient to bring about any marked improvement in definition, contrast or colour of the pattern, but prevents the

TABLE XVII

| Waveform Characteristics | Example 21 | Example 22 | Example 23 | Example 24 |
|---|---|---|---|---|
| Anodic peak voltage (Va) | 55 V | 55 V | 58 V | 55 V |
| Anodic pulse duration (ta) | 10 ms | 10 ms | 10 ms | 10 ms |
| Anodic coulombs/pulse (measured) | 0.35 c | 0.35 c | 0.35 c | 0.35 c |
| Anodic coulombs/m² of glass/pulse | 50 c/m² | 50 c/m² | 50 c/m² | 50 c/m² |
| Anodic-cathodic interval (tac) | 10 ms | 10 ms | 10 ms | 10 ms |
| Cathodic peak voltage (Vc) | 0 | 50 V | 0 | 50 V |
| Cathodic pulse duration (tc) | 10 ms | 10 ms | 10 ms | 10 ms |
| Cathodic coulombs/pulse (measured) | 0 | 0.32 c | 0 | 0.32 c |
| Cathodic coulombs/m² of glass/pulse | 0 | 46 c/m² | 0 | 46 c/m² |
| First cathodic-anodic interval (tca1) | 1400 ms | 1400 ms | 700 ms | 700 ms |
| Second cathodic-anodic interval (tca2) | 1400 ms | 1400 ms | 700 ms | 700 ms |
| Cathodic treatment % (of anodic) | 0% | 92% | 0% | 92% |

TABLE XVIII

| Product characteristics | Example 21 | Example 22 | Example 23 | Example 24 |
|---|---|---|---|---|
| Average total anodic treatment applied | 250 c/m² | 250 c/m² | 500 c/m² | 500 c/m² |
| Transmissin colours | Bronze | Blue (and pink) | Bronze | Blue |
| Solar Control properties | | | | |
| Average White Light transmission | 60% | 39% | 36% | 22% |
| Average Solar Radiant Reflection | 8% | 20% | 11% | 30% |
| Average Solar Radiant Absorption | 30% | 30% | 42% | 38% |
| Average Direct Solar Radiant Transmission | 62% | 50% | 47% | 32% |

During the time when the molten body 36 is connected as a cathode with respect to the glass, migration of cations takes place from the glass surface into the molten body. This migration includes a major proportion of mobile ions in the glass, in particular alkali-metal ions when the glass has an alkali-metal constituent. Thus when the glass is soda-lime-silica glass there is migration of predominantly sodium ions from the glass surface into the molten body. The sodium ions are discharged to sodium metal in the molten body and thereafter act to maintain non-oxidising conditions in the molten body.

Not only does the presence of sodium metal in the molten body act to produce reducing conditions at the interface between the molten body and the glass which are effective to develop the metallic dispersion in the glass, but also the sodium will react with any oxygen in the molten body such as might be released from the glass into the molten body in the course of the electrical action at the interface between the molten body and the glass.

accumulation of polarisation effects due to accretion of metal oxide in the molten body, which metal oxide would otherwise limit the efficiency of transfer of cations from the molten body into the glass during each anodic current pulse of the waveform applied to the molten body.

These polarisation effects have been observed as a falling-off in the efficiency of the treatment when operating with anodic pulses only, and have been demonstrated experimentally with operating conditions as follow:

| | |
|---|---|
| Ribbon speed | 90 meters/hour |
| Ribbon width | 90 mm |
| Ribbon thickness | 4.5 mm |
| Ribbon temperature at electrode position | 720°C |
| Bath atmosphere composition | 10% hydrogen/90% nitrogen |
| Electrode characteristics | |
| Pool composition | 100% indium |
| Bar material | Mild steel |
| Bar shape | Circle (51 mm diameter) |
| Bar width (across bath) | 51 mm |
| Area of bottom of bar equal to pool/glass | |

-continued

| interfacial area) | area) |
|---|---|
| 20.2 cm² (2.02 × 10⁻³ m²) | |

Table XIX, set out below, sets out four examples of operation namely Examples 25 to 28.

In Example 25, without any cathodic treatment it was found that partial fading of the pattern being introduced into the glass began in from 3 to 15 minutes and that the pattern was no longer being introduced into the glass after one hour of treatment of the advancing ribbon from the same body of molten indium.

Example 26 in which there is a cathodic treatment which is 7% of the anodic treatment did not exhibit fading of the pattern until the process had been running for from 15 to 60 minutes. A cathodic treatment as small as 1% of the anodic treatment produces an observable improvement, and the 7 cathodic treatment was apparently militating against the establishment of oxidising conditions in the molten indium body. Nevertheless it was seen that after one hour of ribbon treatment the pattern had faded and no distinct pattern was being introduced into the glass.

A 15% cathodic treatment as in Example 27, and more distinctly a 33% cathodic treatment as in Example 28 avoided the incidence of polarisation fade during the period of the experiments. A cathodic treatment of this lower order of intensity relative to the previous anodic treatment is advantageous which results in the maintenance of non-oxidising conditions in the molten body and is inherent in operation of the process with a higher order of cathodic treatment such as a 40% to 100% or more cathodic treatment already described in some of the examples.

of solar controlled glass having a continuous metallic dispersion introduced into a surface of the glass, and is particularly effective in improving the quality of patterns introduced into a glass surface by the passage of current pulses from the molten body into the glass carrying ions for modifying the glass, followed by a period of cathodic reduction from the same molten metal body.

Using simple electrode shapes great variation in pattern and in tone and colour density of different parts of the pattern, and contrast between different parts of the pattern, can be produced by varying the parameters of the waveform of alternate anodic and cathodic pulses. The time intervals between anodic and cathodic pulses can be adjusted so as to permit inter-diffusion of ions in the glass surface prior to reduction to ensure that the constituent of the molten body which has migrated as cations into the glass surface reverts to its initial state in that surface by the donation of sufficient negative charge from the molten material into the cation-rich glass surface.

Clearer colours and better definition of patterns are produced with the added advantage that fuming from the molten metal body is reduced due to cathodic deoxidation of that body, and wetting of the molten body onto the metal electrode is improved. The electric flux in opposite directions in successive anodic and cathodic pulses minimises distortion of the configuration of the molten body cling to the electrode bar and further minimises any tendency of the pool, at the temperature of treatment, to introduce any distortion into the fire-finished flat upper surface of the float ribbon.

The total quantity of electricity passed whilst the molten body is cathodic with respect to the glass will

TABLE XIX

| | Example 25 | Example 26 | Example 27 | Example 28 |
|---|---|---|---|---|
| Anodic peak voltage (va) | 150 V | 150 V | 150 V | 150 V |
| Anodic pulse duration (ta) | 40 ms | 40 ms | 40 ms | 40 ms |
| Anodic coulombs/pulse | 0.71 c | 0.71 c | 0.75 c | 0.75 c |
| Anodic coulombs/m² of glass/pulse | 352 c/m² | 352 c/m² | 372 c/m² | 372 c/m² |
| Anodic-cathodic interval (tac) | 10 ms | 10 ms | 10 ms | 10 ms |
| Cathodic peak voltage (Vc) | 0 | 40 V | 80 V | 160 V |
| Cathodic pulse duration (tc) | 10 ms | 10 ms | 10 ms | 10 ms |
| Cathodic coulombs/pulse | 0 | 0.05 c | 0.11 C | 0.25 c |
| Cathodic coulombs/m² of glass/pulse | 0 | 25 c/m² | 55 c/m² | 124 c/m² |
| First cathodic-anodic interval (tca1) | 480 ms | 480 ms | 480 ms | 480 ms |
| Second cathodic-anodic interval (tca2) | 480 ms | 480 ms | 480 ms | 480 ms |
| Cathodic treatment % (of anodic) | 0% | 7% | 15% | 33% |
| Maximum anodic treatment applied (four treatments) | 1408 c/m² | 1408 c/m² | 1488 c/m² | 1488 c/m² |
| Duration of ribbon treatment before onset of partial fading | 3–15 mins | More than 15–60 mins | More than 60 mins | 60 mins |
| Degree of fading after one hour of ribbon treatment | Almost complete | Almost complete | None | None |
| White Light Transmission | | | | |
| Initially (average) | 44% | 39% | 35% | 23% |
| After fading | 74% | 74% | — | — |

The anodic treatment followed by cathodic treatment of the glass surface from a single molten body is accompanied by an increase in efficiency of production generally be less than the total quantity passed whilst the molten body is anodic with respect to the glass, although it may be the same as, or in some cases even greater than, the latter quantity. When the primary purpose of the cathodic current is to maintain non-oxidising conditions in the molten body, only small amounts of cathodic current are necessary, for example 1% of the total anodic quantity may be useful. However it is more usual to employ from 5% to 50% of the total anodic quantity. When the cathodic current is being used not only to maintain non-oxidising conditions in the pool, but also to reduce metal ions in the glass surface, it is usual to employ higher proportions of cathodic electricity, for example from 30% to 99% of the total quantity of anodic electricity passed.

The techniques of the present invention are especially valuable when using a pool of molten indium to provide a dispersion of indium in the glass. In practice, the indium pool may be liable to polarisation which inhibits migration of indium ions into the glass. This difficulty may be overcome, or at least alleviated as described herein, by intermittently connecting the pool as a cathode with respect to the glass. Moreover, when indium ions are passed into the glass they produce a pattern of varied and attractive colouring, which is especially suitable for decorative purposes.

As well as employing the invention in the treatment of a ribbon of flat glass the method can be employed for the treatment of glass articles such as articles of pressed tableware and hollow glass blocks. Rolled glass can acquire desired surface characteristics, either continuous or patterned, by the method of the invention while the glass is still hot and the invention can be applied to rolled glass having a pattern rolled into the glass which pattern is further enhanced by the application of a metallic dispersion in the surface of the glass which may be in pattern form enhancing pattern shape rolled into the glass surface.

We claim:

1. In a method of modifying a glass surface in which glass is contacted with a molten metal body while the glass is at a temperature at which it is susceptible to surface modification, relative movement is effected between the molten metal body and the glass, and migration of cations from the molten metal body into the glass surface is electrically induced, the improvement comprising periodically during said migration connecting said molten metal body as a cathode with respect to the glass for a preset time by the transmission of cathodic pulses of preset duration to the molten metal body, and regulating the quantity of electricity passing in each cathodic pulse to a value sufficient at least partially to de-oxidise the molten metal body.

2. In a method of modifying a glass surface in which glass is contacted with a molten metal body while the glass is at a temperature at which it is susceptible to surface modification, relative movement is effected between the molten metal body and the glass, and migration of cations from the molten metal body into the glass is electrically induced, the improvement comprising periodically during said migration of cations from the molten metal body into the glass, connecting said molten metal body as a cathode with respect to the glass for a preset time by the transmission of cathodic pulses of preset duration to the molten metal body, and regulating the quantity of electricity passing in each cathodic pulse to a value which causes migration of sufficient cations from the glass into the molten metal body in said cathodic pulse to maintain non-oxidising conditions in the molten metal body.

3. A method of modifying a glass surface comprising contacting the glass with a molten metal body while the glass is at a temperature at which it is susceptible to surface modification, effecting relative movement between the molten metal body and the glass, and periodically, during treatment of the glass surface by electrically induced migration of cations from the molten metal body into the glass, connecting said molten metal body as a cathode with respect to the glass for a preset time, and regulating the quantity of electricity which passes in each said preset time to cause in each said preset time sufficient migration of cations from the glass into the molten metal body to maintain non-oxidising conditions in the molten metal body.

4. A method of manufacturing glass having a metallic dispersion of predetermined intensity in a surface thereof, comprising contacting the glass with a molten metallic body while the glass is at a temperature at which it is susceptible to surface modification, effecting relative movement between the molten metallic body and the glass, electrically connecting the molten metallic body as an anode with respect to the glass to cause migration of cations into the glass and to develop a cation concentration in the glass surface, and subsequently, before any substantial dispersion of said cation concentration into the glass, connecting said molten metallic body as a cathode with respect to the glass for a preset time, and regulating the quantity of electricity passing in said preset time to a value sufficient to promote electrical action at the interface between the molten metallic body and the glass causing reduction of at least a proportion of the cations in the glass surface to produce said metallic dispersion.

5. A method of manufacturing glass having a metallic dispersion of predetermined intensity in a surface thereof, comprising contacting a surface of the glass with a body of molten metal while the glass is at a temperature at which it is susceptible to surface modification, effecting relative movement between the body of molten metal and the glass, electrically connecting the molten metal body as an anode to cause migration of metal ions from the molten metal body into the glass surface, subsequently electrically connecting said molten metal body as a cathode with respect to the glass surface for a preset time, and regulating the quantity of electricity passing in said preset time to a value sufficient to cause cathodic reduction of metal ions in the glass surface and thereby produce said metallic dispersion.

6. A method of producing a metallic dispersion of predetermined intensity in a surface of glass having an alkali-metal constituent, comprising contacting the glass with a molten metal body while the glass is at a temperature at which it is susceptible to surface modification, effecting relative movement between the molten metal body and the glass, electrically connecting the molten metal body as an anode with respect to the glass to cause migration of metal ions into the glass, and subsequently connecting the molten metal body as a cathode with respect to the glass for a preset time, and regulating the quantity of electricity passing in said preset time to cause migration of sufficient alkali-metal ions from the glass into the molten metal body to promote reducing conditions in the molten metal body.

7. In a method of modifying a glass surface in which glass is contacted with a molten metal body while the glass is at a temperature at which it is susceptible to surface modification, relative movement is effected between the molten metal body and the glass, and cationic migration of a constituent of the molten metal body is electrically induced into the glass surface, the improvement comprising subsequently electrically causing donation in a preset time of sufficient negative charge from said molten metal body into the cation-rich glass surface to cause said constituent to revert in the glass to its initial chemical form thereby producing a required dispersion of that constituent in the glass surface while the molten metal body is in contact with the glass.

8. A method of manufacturing glass having a metallic dispersion of predetermined intensity in a surface thereof, comprising contacting the glass which is at a temperature at which the glass is susceptible to surface modification with a confined molten metal body, effecting relative movement between the confined molten metal body and the glass, electrolytically causing migration of metal ions from that body into the glass surface for a preset time, subsequently electrolytically causing ionic flow from that surface into the body at a rate sufficient to engender reducing conditions at the interface between the molten metal body and the glass, and then maintaining contact between the molten metal body and the glass for a preset time sufficient to reduce metal ions in the glass surface thereby producing said metallic dispersion.

9. A method according to claim 1, comprising causing said electrically induced migration of cations from the molten metal body into the glass surface by electrically connecting said molten metal body as an anode with respect to the glass for a first preset time, and after a predetermined interval electrically connecting the molten metal body as a cathode with respect to the glass for a second preset time sufficient at least partially to de-oxidise the molten metal body.

10. A method according to claim 4, comprising electrically connecting the molten metallic body as an anode with respect to the glass for a first preset time, and after a predetermined time interval and before any substantial dispersion of said cation concentration into the glass, electrically connecting the molten metallic body as a cathode with respect to the glass for a second preset time sufficient to cause reduction of at least a proportion of the cations in the glass surface to produce said metallic dispersion.

11. A method according to claim 4, of manufacturing flat glass having a metallic dispersion of predetermined intensity in a surface thereof, comprising advancing the glass at a controlled speed beneath a confined molten metal body contacting the upper surface of the glass, and applying to the molten metal body a voltage waveform comprising anodic and cathodic pulses of preset duration separated by preset intervals such that ionic migration into the glass surface from the molten metal body when it is anodic with respect to the glass precedes cathodic reduction of those cations in the contacted glass surface during and subsequent to the period when the molten body is cathodic with respect to the glass, and regulating the amplitude, duration and temporal spacing of the pulses of the waveform to produce said metallic dispersion in the glass.

12. A method according to claim 4, of manufacturing float glass having a metallic dispersion of predetermined intensity in a surface thereof, comprising advancing a ribbon of glass at a controlled speed along a bath of molten metal, locating a molten metal body on the upper surface of the advancing ribbon of glass, applying to the molten metal body a voltage waveform comprising anodic and cathodic pulses of preset duration separated by preset intervals so related to the ribbon speed that at least one anodic and one cathodic pulse occur in the time taken for an increment of the ribbon to pass beneath the molten metal body, whereby migration of metal cations into the glass surface from the molten body when it is anodic with respect to the glass precedes cathodic reduction of those cations in the glass by the molten body during and subsequent to the time when the molten body is cathodic with respect to the glass, and regulating the amplitude, duration and temporal spacing of the pulses of the waveform to produce the required metallic dispersion in the glass.

13. A method according to claim 11, wherein the molten metal body is of rectangular form extending transversely of the glass, and the amplitude, duration and spacing of the pulses of said voltage waveform are preset to impart a striped appearance to the metallic dispersion.

14. A method according to claim 11, wherein the molten metal body is shaped to a configuration progenitive of an element of a pattern to be produced in the glass by a corresponding pattern-forming distribution of said metallic dispersion, and the amplitude, duration and spacing of the pulses of said voltage waveform are preset to produce said pattern-forming distribution in the glass surface.

15. A method according to claim 1, wherein migration of cations from the molten metal body into the glass is caused by connecting the molten metal body as an anode with respect to the glass, the migration of cations from the glass into the molten metal body is caused by connecting the molten metal body as a cathode with respect to the glass, and the quantity of anodic electricity which passes to cause said migration of cations from the molten metal body into the glass is regulated to a value which is different from the regulated quantity of cathodic electricity which passes to cause said migration of cations from the glass into the molten metal body.

16. A method according to claim 15, wherein the quantity of cathodic electricity is from 5% to 50% of the quantity of anodic electricity.

17. A method according to claim 4, wherein the quantity of anodic electricity which passes to cause said migration of cations into the glass is different from the quantity of cathodic electricity which promotes said electrical action at the interface between the molten body and the glass.

18. A method according to claim 17, wherein the quantity of cathodic electricity is from 30% to 99% of the quantity of anodic electricity.

19. A method according to claim 1, wherein the molten metal body is a body of molten indium.

20. Apparatus for manufacturing glass with a modified surface comprising an electrically conductive contact for one surface of the glass, electrode means for maintaining a body of molten metal in contact with the other surface of the glass, an electrical supply source connected to said contact and to said electrode means through a switchable supply circuit, and a control waveform generator connected to said switchable supply circuit and including settable means operable to cause the generator to produce a control waveform consisting of a sequence of switching pulses for application to the switching circuit to control the switching of a sequence of anodic and cathodic current pulses to the electrode means to effect the required modification of the glass surface.

21. Apparatus according to claim 20, wherein the switchable supply circuit comprises two thyristor bridge circuits respectively controlling the supply of anodic and cathodic current pulses to the molten metal body, and the waveform generator is connected to trigger electrodes of the thyristors and is operable to produce timed firing pulses for application to the thyristors to effect switching to the molten metal body of the required sequence of anodic and cathodic current pulses.

22. A method of modifying a glass surface comprising:

contacting the glass with a body of molten indium while the glass is at a temperature at which it is susceptible to surface modification;

moving the glass relative to the molten indium body;

electrically inducing migration of indium ions from the molten indium body into the moving glass;

periodically during said migration of indium ions, connecting the molten indium body as a cathode with respect to the glass for a preset time; and regulating the quantity of electricity which passes in each said preset time to cause sufficient migration of cations from the glass into said molten indium body to maintain non-oxidising conditions in the molten indium body.

23. A method of manufacturing glass having a dispersion of metallic indium in a surface thereof, comprising:

contacting the glass with a molten indium body while the glass is at a temperature at which it is susceptible to surface modification;

moving the glass relative to the molten indium body;

electrically connecting the molten indium body as an anode with respect to the glass to cause migration of indium ions into the glass to develop a concentration of indium ions in the glass surface; and subsequently, before any substantial dispersion of said concentration of indium ions into the glass, connecting said molten indium body as a cathode with respect to the glass to promote electrical action at the interface between the molten indium body and the glass causing reduction of at least a proportion of the indium ions in the glass surface to produce said dispersion of metallic indium.

24. A method of manufacturing flat glass having a dispersion of metallic indium in a surface thereof, comprising:

advancing a ribbon of glass at a controlled speed along a molten metal bath;

locating a body of molten indium on the upper surface of the advancing ribbon of glass;

applying to the molten indium body a voltage waveform comprising anodic and cathodic pulses of preset duration separated by preset intervals so related to the ribbon speed that at least one anodic pulse and one cathodic pulse occur in the time taken for an increment of the ribbon to pass beneath the molten indium body, whereby migration of indium ions from the molten body into the glass surface when the molten body is anodic with respect to the glass precedes cathodic reduction of those indium ions in the glass by the molten indium body during and subsequent to the time when the molten indium body is cathodic with respect to the glass; and regulating the amplitude, duration and temporal spacing of the pulses of the waveform to produce the required dispersion of metallic indium in the glass.

25. A method of modifying the upper surface of a ribbon of flat glass advancing along a bath of molten metal, comprising:

contacting the upper surface of the advancing ribbon with a molten metal body;

connecting an electrical supply circuit to the molten metal body and to the molten metal bath;

transmitting anodic pulses from the supply circuit to the molten metal body to enforce migration of cations from the molten metal body into the glass surface during each said anodic pulse; and periodically during said transmission of anodic pulses, transmitting cathodic pulses from the supply circuit to said molten metal body, the quantity of electricity passing in each cathodic pulse being sufficient at least partially to de-oxidise the molten metal body.

* * * * *